US008073491B2

(12) United States Patent
Uno et al.

(10) Patent No.: US 8,073,491 B2
(45) Date of Patent: *Dec. 6, 2011

(54) COMMUNICATION SYSTEM AND METHOD

(75) Inventors: Masahiro Uno, Fellbach (DE);
Zhaocheng Wang, Stuttgart (DE);
Volker Wullich, Stuttgart (DE);
Kao-Cheng Huang, Kent (GB)

(73) Assignee: Sony Deutschland GmbH, Cologne (DE)

( * ) Notice: Subject to any disclaimer, the term of this patent is extended or adjusted under 35 U.S.C. 154(b) by 0 days.

This patent is subject to a terminal disclaimer.

(21) Appl. No.: 12/686,728

(22) Filed: Jan. 13, 2010

(65) Prior Publication Data
US 2010/0113099 A1    May 6, 2010

Related U.S. Application Data

(63) Continuation of application No. 11/282,026, filed on Nov. 17, 2005, now Pat. No. 7,680,517.

(30) Foreign Application Priority Data

Nov. 19, 2004 (EP) .................................. 04027554
Jan. 27, 2005 (EP) .................................. 05001674

(51) Int. Cl.
*H04Q 7/20* (2006.01)

(52) U.S. Cl. .............. 455/562.1; 455/552.1; 455/553.1; 455/561; 455/550.1; 455/426.1; 370/329; 370/328; 370/343; 370/310

(58) Field of Classification Search ............... 455/552.1, 455/553.1, 550.1, 426.1, 426.2, 422.1, 403.5, 455/517, 434, 432.1, 432.2, 524, 525, 67.11, 455/456.1–457; 370/329, 328, 343, 310
See application file for complete search history.

(56) References Cited

U.S. PATENT DOCUMENTS 6,498,939 B1    12/2002   Thomas
7,027,837 B1    4/2006    Uhlik et al.
2006/0067433 A1 3/2006    Wang et al.

FOREIGN PATENT DOCUMENTS

| JP | 8-321799 | 12/1996 |
| JP | 2000-307494 | 11/2000 |
| WO | WO 97/44978 | 11/1997 |
| WO | WO 98/36595 | 8/1998 |
| WO | WO 01/39320 | 5/2001 |

OTHER PUBLICATIONS

"IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 5: Spectrum and Transmit Power Management Extensions in the 5GHz band in Europe," Published Oct. 14, 2003, IEEE Std 802.11h™—2003, 75 Pages.

John G. Proakis, "Digital Communications", Third Edition, McGraw Hill Series in Electrical and Computer Engineering, cover pages of the book including list of contents (11 pages) and pp. 1-928 of the book. No date available.

Office Action issued Nov. 24, 2010 in Japan Application No. 2005-336227 (English Translation).

*Primary Examiner* — Keith Ferguson
(74) *Attorney, Agent, or Firm* — Oblon, Spivak, McClelland, Maier & Neustadt, L.L.P.

(57) ABSTRACT

A communication system including a first station having at least two first narrow beam antennas and a second station having at least two second narrow beam antennas. The first and second stations establish a first communication path for wireless communication via a pair of first and second narrow beam antennas. When communication via the first communication path is disturbed by obstacles, the first and second stations automatically establish at least one alternative communication path, which is spatially different from the first communication path, for wireless communication using the at least two first narrow beam antennas and the at least two second narrow beam antennas.

38 Claims, 11 Drawing Sheets

COMMUNICATION SYSTEM AND METHOD

CROSS-REFERENCE TO RELATED APPLICATIONS

This application is a continuation of and is based upon and claims the benefit of priority under 35 U.S.C. §120 for U.S. Ser. No. 11/282,026, filed Nov. 17, 2005, now U.S. Pat. No. 7,680,517, the entire contents of which are incorporated herein by reference and U.S. Ser. No. 11/282,026 claims the benefit of priority under 35 U.S.C. §119 from European Patent Application No. 05 001 674.0, filed Jan. 27, 2005 and European Patent Application No. 04 027 554.7, filed Nov. 19, 2004.

BACKGROUND

A more complete appreciation of the invention and many of the attendant advantages thereof will be readily obtained as the same becomes better understood by reference to the following detailed description when considered in connection with the accompanying drawings, wherein:

The present invention relates to a communication system comprising the features of the preamble of independent claim 1. Furthermore, the present invention relates to a corresponding communication method.

FIELD OF THE DISCLOSURE

Wireless communication is used in a large variety of technical fields. Typical examples are mobile phone, wireless LAN, walkie-talkies, radio systems and point-to-point radio systems.

The communication radius covered by a respective communication system basically depends on the technique used. Whereas GSM and UMTS are adapted for a communication radius up to about 10 km, wireless LAN frequently is restricted to about 100 m and the Bluetooth system usually is limited to about 20 m. The major influences on the communication range of a communication technique are the transmission frequency and output power used. Whereas only little absorption of electromagnetic waves in the atmosphere occurs at the transmission frequencies used for GSM/UMTS a significant absorption occurs in the 60 GHz range. Thus, the 60 GHz range suits best for low and middle communication radiuses.

Furthermore, the kind of antenna used for a respective wireless communication technique varies depend on a respective field of application.

If large numbers of receivers have to be reached or the location of the receiver is unknown or varies frequently, wide-beam antennas are used.

On the other hand, if only one or at least a very limited number of receivers have to be reached and the respective receiver(s) is/are stationary or at least quasi-stationary narrow-beam antennas can be used.

The utilisation of wide beam antennas in high data rate systems (e.g. over 1 Gbps) is problematic because of the multi-path fading effect. This multi-path fading effect is caused by differences of travelling time between radio wave paths of the same transmission, as experienced at the receiving station.

The multi-path fading effect is shown in FIG. 12.

As shown in FIG. 12, if wide beam antennas 121, 123, with e.g. a half power beam width (HPBW) of 100° are used for both a first station 120 at a sending side and a second station 122 at a receiving side and a line-of-sight 12f (LOS) communication path is blocked by an obstacle 124, there exist a lot of reflection paths 12a, 12b, 12c, 12d and 12e between the first station 120 and the second station 122 due to a plurality of reflecting surfaces 125, 126, 127, 128 and 129. The channel delay spread might be over tens of symbol periods when the data transmission rate is high (e.g. over 1 Gbps), which leads to severe inter-symbol interference (ISI) due to deep frequency selective fading.

As it is obvious from FIG. 12, the multi-path fading effect most likely occurs in city-centres or in indoor environments where a plurality of reflecting surfaces 125, 126, 127, 128 and 129 (e.g. walls) are present.

Two conventional solutions exist for such kind of a no-line-of-sight (NLOS) user scenario:

One adopts channel equaliser including a linear, a decision feedback or a maximum likelihood sequence estimation (MLSE) equaliser. When the channel delay spread is much longer than the symbol duration, the equaliser becomes complex and needs a lot of processing power.

Another solution is the orthogonal frequency division multiplexing (OFDM) technique, which is already adopted in wireless LAN systems. However, due to its inherent linear modulation and high peak to average ratio problems, the power consumption of a power amplifier (PA) used with the OFDM technique is very high.

Thus, both solutions need high-speed and complex signal processing circuits.

In order to reduce the channel distortion, the adoption of a wide beam antenna 123 at one side and a sharp half power beam width (HPBW) steering antenna at another side for a no-line-of-sight (NLOS) user scenario is known as it is shown in FIG. 13.

The wide beam antenna 121 of the first station 120 of FIG. 12 is replaced by a sharp beam antenna 131. Said sharp beam antenna 131 is steered to the optimum position (with feasible steering resolution), which could match to the strong reflection path 12b and 12c caused by the reflecting surfaces 127 and 128. Due to the usage of said sharp beam antenna 131, the reflection signals 12a, 12d and 12e shown in FIG. 13 are not generated and thus can not reach the wide beam antenna 123 of the second station 122. Therefore, the channel delay spread is shortened.

Furthermore, another system concept is to use a pair of sharp beam steering antennas 131 and 143 on both the transmitting first station 120 and the receiving second station 122 side, which can be seen in FIG. 14.

Both sharp beam steering antennas 131 and 143 can be steered to an optimum position, where strong reflection signals 12c caused by a reflecting surface 128 can be transmitted and received by both sharp beam steering antennas 131 and 143 of the first and second station 120, 122. As a result, the reflection signals 12a, 12b, 12d and 12e shown in FIG. 14 are not generated and thus cannot reach the second station 122. Thus, the channel delay spread can be further shortened. In addition, considering the additional antenna gains obtained by both sharp beam antennas 131 and 143, a strong received signal 12c with a relatively small frequency selective fading channel can be obtained.

The usage of narrow beam antennas as it is described with respect to FIGS. 13 and 14 has the disadvantage that due to the limited beam width emitted by a narrow beam antenna tracking of both antennas is very difficult in no line of sight scenarios. Another problem is that a fast steering of the narrow beam antennas is necessary after a loss of the direct or indirect communication path has occurred in order to keep the data rate of the respective wireless communication system.

In summary the state of the art suffers from the following disadvantages:

Communication systems utilising wide beam antennas have to cope with the multi-path fading effect. This effect is even amplified when using high data rates. To overcome the multi-path fading effect, complex equalisers or complex modulation scheme e.g., OFDM are required.

Communication systems using narrow beam antennas have fewer problems concerning the multi-path fading effect. With communication using systems narrow beam antennas it is very difficult to support communication under non-line-of-sight conditions. Moreover, in a communication system with narrow beam antennas on both sides, the replacement of a broken link is very time consuming since a new suitable communication path has to be searched. This results in a significant decrease of the data transmission rate.

SUMMARY

It is the object of the present invention to overcome the above-cited disadvantages of the prior art and to provide a communication system that has a good availability even in indoor no-line-of-sight scenarios and guarantees a high data rate while having a simple and cheap structure.

The above object is solved in a communication system comprising the features of the preamble of independent claim 1 by the features of the characterising part of independent claim 1.

Furthermore, the above object is solved in a communication method comprising the features of the preamble of independent claim 16 by the features of the characterising part of independent claim 16.

A communication system comprises a first station comprising a first narrow beam antenna and a second station comprising a second narrow beam antenna, wherein the first and second stations are adapted to establish a first communication path for wireless communication via said first and second narrow beam antennas. According to the present invention said first and second stations are adapted to automatically establish at least one alternative communication path for wireless communication via said first and second narrow beam antennas, said alternative communication path being spatially different from said first communication path.

Thus, it is guaranteed that a new communication path automatically is generated in case an existing communication path is disturbed.

According to a preferred embodiment said first station comprises at least two first narrow beam antennas and said second station comprises at least two second narrow beam antennas, wherein the first and second stations are adapted to establish at least one further communication path for wireless communication via said further first and second narrow beam antennas while maintaining said first communication path, said further communication path being spatially different from said first communication path.

Thus, according to the present invention narrow beam antennas are used on both sides of the communication path by the first and second station, respectively. Besides a possible line-of-sight communication path (link) at least one additional indirect communication path (link) is used to increase the probability that at least one communication path is available all the times. Therefore, a high data rate can be guaranteed since at least one communication path is indirect. Thus, the inventive communication system is capable to operate even under non line-of-sight conditions. Furthermore, the inventive communication system has a high signal to noise ratio (SNR) due to a maximum ratio combining effect resulting from the plural communication paths. Although the inventive communication system is suitable for any environment where a sufficient number of reflecting surfaces are available, it is recommended that the inventive communication system works in indoor environments.

By the usage of narrow beam antennas, only, the inventive communication system reduces the negative effects of multi-path selective fading. Moreover, the inventive communication system has a simple and cheap structure since it does not require complex equalisers or modulation scheme, e.g., OFDM.

Preferably, said first station further comprises a first wide beam antenna and/or said second station further comprises a second wide beam antenna.

Thus, the first and/or second station is adapted to establish at least a preliminary communication path to the respective other station with a low data rate to agree on establishment of the at least two spatially separated communication paths via said at least two first and second narrow beam antennas at a high data transmission rate.

It is beneficial if said first and second stations further comprise first and second sensors for determining a receive signal strength indicator RSSI value of a signal received via a certain communication path by using a certain narrow beam antenna.

Thus, the first and second stations are adapted to detect the quality and availability of a respective communication path. Moreover, by using the determined receive signal strength indicator RSSI value the first and second stations are adapted to determine whether a respective first and second narrow beam antenna is qualified for establishing a communication path between said first and second station.

Favourably, said first and second stations further comprise first and/or second memories for storing said receive signal strength indicator RSSI value determined for a certain pair of narrow beam antennas for a certain communication path.

By storing said receive signal strength indicator RSSI values in first and/or second memories all first and second narrow beam antennas of the first and second station are benchmarked with respect to their qualification to establish a communication path in a respective environment. Thus, pre-recalled RSSI values stored in said first and/or second memories can be used to quickly establish a new communication path between said first and second station.

Moreover it is preferred that said receive signal strength indicator RSSI value determined for a certain narrow beam antenna for a certain communication path is stored in first/second RSSI matrixes in said first and/or second memories, respectively.

The usage of first/second RSSI matrixes to store said receive signal strength indicator RSSI values allow an easy allocation of a respective RSSI value to a respective first or second narrow beam antenna.

Preferably said first station and/or said second station further comprise distinguishing means for distinguishing between a direct communication path and an indirect communication path established by a pair of first and second narrow beam antennas.

Furthermore, in the preferred embodiment it is beneficial if said first station and/or said second station further comprise distinguishing means for distinguishing between a direct communication path established by a pair of first and second narrow beam antennas and an indirect communication path established by another pair of first and second narrow beam antennas.

With the usage of distinguishing means the first and/or second stations are further adapted to automatically differentiate line-of-sight scenarios from no-line-of-sight scenarios by the detection of the presence or absence of a direct communication path between said first and second station.

Preferably, said first and second stations further comprise determining means for determining a relative distance between a respective narrow beam antenna used for a direct communication path and a respective narrow beam antenna used for an indirect communication path.

With the usage of determining means said first and second stations are adapted to guarantee that said at least two communication paths between said first and second stations are indeed spatially different. In consequence, the inventive communication system automatically ensures that the probability that all communication paths are blocked by a suddenly appearing obstacle is very low. Furthermore, said determined relative distance can be used when establishing new direct or indirect communication paths between said first and second station.

It is beneficial if said first and second stations further comprise first and second controllers for replacing a disturbed direct communication path by using first and second narrow beam antennas having a high RSSI and a low relative distance to the respective narrow beam antenna used for the disturbed direct communication path.

It is preferred that said first and second stations are stationary or quasi-stationary.

Thus, according to the present invention previously accomplished RSSI measurements are used to quickly restore a disturbed communication path. Considering the fact that disruption of a communication path most probably is triggered by occasionally appearing obstacles and/or sometimes by station movements this guarantees a very good availability of at least one communication path in time.

Favourably, said first and second controllers further are adapted to replace a disturbed indirect communication path by using first and second narrow beam antennas having a high RSSI and a middle or high relative distance to the respective narrow beam antenna used for the disturbed direct communication path.

In consequence, the inventive communication system automatically ensures that a disturbed indirect communication path is not erroneously replaced by a communication path parallel to the direct communication path.

If both the first and/or second stations are stationary or quasi-stationary reliable indirect communication path between said first and second station can be established since a movement of reflecting surfaces is rather unlikely.

Preferably, said first and second narrow beam antennas are switched beam antennas or adaptive antenna arrays or mechanical/manual steering antennas.

According to a preferred embodiment said communication system is an indoor communication system.

The reason is that indoor environments usually comprise a plurality of reflecting surfaces suitable for establishing indirect communication paths. A transmission frequency of about 60 GHz is usually reflected by walls and other reflecting surfaces present in indoor environments.

It is beneficial if said first and second stations are adapted for bi-directional wireless communication using a transmission frequency of about 60 GHz via said communication paths.

According to the present invention a communication method for providing wireless communication between a first station and a second station comprises the following steps:

establishing a primary communication path via a first narrow beam antenna of said first station and a second narrow beam antenna of said second station; and establishing at least one alternative communication path via said first narrow beam antenna of said first station and said second narrow beam antenna of said second station, wherein said at least one secondary communication path is spatially different from said primary communication path.

Thus, it is guaranteed that a new communication path automatically is generated in case an existing communication path is disturbed.

According to a preferred embodiment said method further comprises the steps of establishing at least one secondary communication path via another first narrow beam antenna of said first station and another second narrow beam antenna of said second station, wherein said other first and second narrow beam antennas are chosen in a way that said at least one secondary communication path is spatially different from said primary communication path; and performing wireless communication between said first and second station via said primary and/or said at least one secondary communication path.

Thus, according to the present invention at least two spatially different communication paths between said first and second stations are maintained at the same time. Besides a possible line-of-sight communication path (link) at least one additional indirect communication path (link) is used to increase the probability that at least one communication path is available all the times. Due to the presence of at least one communication path, a high data rate can be guaranteed. Moreover, the inventive communication method guarantees wireless communication even under non line-of-sight conditions when no line-of-sight communication path is available. Furthermore, the inventive communication method results in a high signal to noise ratio (SNR) due to a maximum ratio combining effect resulting from the plural communication paths. Although the inventive communication method is suitable for any environment where a sufficient number of reflecting surfaces is available, the inventive communication method works best in indoor environments.

By the usage of narrow beam antennas for establishing communication paths, only, the inventive communication method reduces the negative effects of multi-path selective fading.

According to a preferred embodiment of the inventive communication method the step of establishing a primary communication path comprises the steps of:

Sending test signals from said first station to said second station by successively using all first narrow beam antennas of said first station and by determining an individual receive signal strength indicator RSSI value of a test signal received by said second station for each first narrow beam antenna of said first station;

Selecting a respective first narrow beam antenna of said first station having the best receive signal strength indicator RSSI value for establishing the primary communication path;

Sending test signals from said first station to said second station by using said selected first narrow beam antenna of said first station and receiving said test signals by successively using all second narrow beam antennas of said second station, wherein an individual receive signal strength indicator RSSI value of said test signal received by a respective second narrow beam antenna of said second station is determined for each second narrow beam antenna; and Selecting a respective second narrow beam antenna of said second station having the best receive signal strength indicator RSSI value for establishing the primary communication path.

By using a received signal strength indicator RSSI value of a respective first and second narrow beam antenna the inventive method establishes direct and indirect communication paths between said first and second stations in a quick and easy way.

In the preferred embodiment it is beneficial if the step of sending test signals from said first station to said second station is performed by:

Sending a test signal from said first station to said second station by using a first narrow beam antenna of said first station and a wide beam antenna of said second station;

Determining a receive signal strength indicator RSSI value of said test signal received from said first narrow beam antenna; and Sending a further test signal from said first station to said second station by using another first narrow beam antenna of said first station, said test signal being received by said second wide beam antenna of said second station and determining another receive signal strength indicator RSSI value of said further test signal received from said other first narrow beam antenna until an individual receive signal strength indicator RSSI value has been determined for every first narrow beam antenna of said first station.

Furthermore, it is preferred that the step of establishing a primary communication path is initiated by the step of establishing a preliminary communication path between said first and second stations via a first wide beam antenna of said first station and a second wide beam antenna of said second station to detect the presence of a respective first and second station.

Usage of a wide beam antenna increases the velocity of establishment of communication path between the first and second station via narrow beam antennas since it is not necessary to steer narrow beam antennas on both sides of the communication path to establish a first communication path between said first and second station.

Favourably, the sub-step of determining an individual receive signal strength indicator RSSI value of a test signal received by a receiving station for each narrow beam antenna of a sending station comprises the transmission of the determined individual receive signal strength indicator RSSI value from the receiving station to the sending station.

In consequence, the inventive communication method allows each first and second station to store the RSSI values for the first and second narrow beam antennas belonging to a respective station.

It is beneficial if the individual receive signal strength indicator RSSI values determined for the individual first and second narrow beam antennas are stored in first and second RSSI tables, respectively.

Preferably, the step of establishing at least one secondary communication path is performed by:

Determining a relative distance between a respective first/second narrow beam antenna used for said primary communication path and unused first/second narrow beam antennas;

Identifying unused first and second narrow beam antennas having a sufficiently high receive signal strength indicator RSSI value and a sufficient distance relative to the respective first/second narrow beam antenna used for said primary communication path; and Establishing the at least one secondary communication path by using said identified first and second narrow beam antennas.

In this respect it is preferred that the step of establishing the at least one secondary communication path by using said identified first and second narrow beam antennas is performed until no further unused first and second narrow beam antennas having a sufficiently high receive signal strength indicator RSSI value and a sufficient distance relative to the respective first/second narrow beam antenna used for said primary communication path can be identified.

Favourably, the step of performing wireless communication between said first and second station via said primary and/or at least one secondary communication path comprises the steps of:

Determining availability of the primary communication path and of the at least one secondary communication path;

Using the primary communication path for wireless communication and returning to the determining step if the primary communication path and the at least one secondary communication path are available;

Using the primary communication path for wireless communication and establishing at least one new secondary communication path if the primary communication path is available and the at least one secondary communication path is unavailable;

Using the secondary communication path for wireless communication and establishing a new primary communication path if the primary communication path is unavailable and the at least one secondary communication path is available; and Returning to the step of establishing a primary communication path if neither the primary communication path nor the at least one secondary communication path is available.

In this respect it is beneficial if the respective first and second narrow beam antennas having the highest available signal strength indicator RSSI value are used in the step of establishing a new primary communication path.

Furthermore, in said step of performing wireless communication between said first and second station via said primary and/or at least one secondary communication path preferably a bi-directional wireless transmission using a transmission frequency of about 60 GHz is performed.

The above object is further solved by a computer program product directly loadable into the internal memory of a microprocessor of an electronic equipment, comprising software code portions for performing the steps of one of the claims 26 to 27 when said product is run by said microprocessor.

In this respect it is preferred if the computer program product is embodied on a computer readable medium.

BRIEF DESCRIPTION OF THE DRAWINGS

In the following, preferred embodiments of the present invention are further explained by reference to the accompanying drawings, in which like reference numbers refer to like parts.

FIG. 1 schematically shows a preferred embodiment of the inventive communication system;

DETAILED DESCRIPTION

Figure 2A:
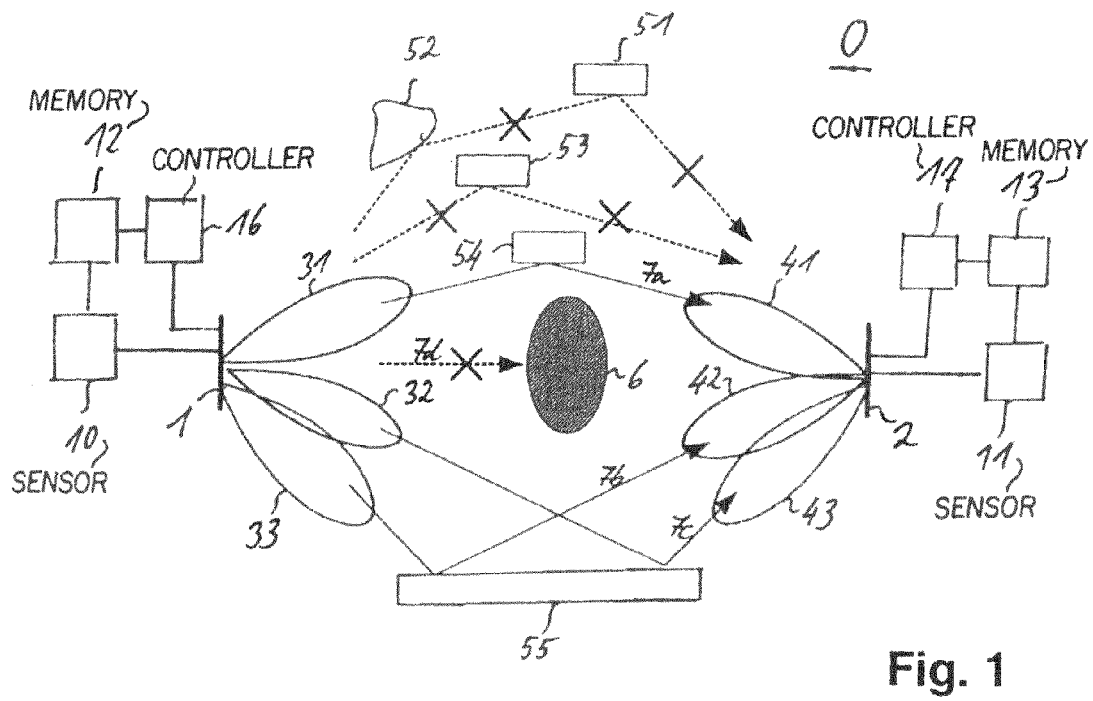
FIGS. 2A, 2B schematically show a side-view respectively front-view of a cross section along the axis S through four beams of communication paths.

In the following, a preferred embodiment of the inventive communication system is explained by reference to FIG. 1.

The communication system 0 comprises a first station 1 comprising three first narrow beam antennas 31, 32, 33 and a second station 2 comprising three second narrow beam antennas 41, 42, 43.

In the present embodiment, both the first and second narrow beam antennas 31, 32, 33, 41, 42, 43 are smart antennas.

The first and second stations 1, 2 are adapted to establish at least one first communication path 7a and one further communication path 7b, 7c for wireless communication via said first and second narrow beam antennas 31, 32, 33, 41, 42, 43 at the same time.

Said further communication path 7b, 7c is spatially different from said first communication path 7a.

Thus, according to the present invention, usage of several pairs of narrow (sharp) beam antennas 31, 32, 33, 41, 42, 43 for both a sending and receiving side of the station 1, 2 is proposed. Each first narrow beam antenna 31, 32, 33 of the first station 1 is steered to meet a corresponding second narrow beam antenna 41, 42, 43 of the second station 2 along a corresponding communication path 7a, 7b, 7c. Therefore, the usage of more than one pair of narrow beam antennas 31, 32, 33, 41, 42, 43 realises path diversity for environments where no static communication path In the present embodiment a communication path delay spread is shortened and therefore the communication path becomes flat and relatively frequency non-selective.

As it is obvious from FIG. 1, a direct line of sight communication path 7d between said first and second station 1, 2 is blocked by an obstacle 6.

Thus, said communication paths 7a, 7b, 7c are indirect communication paths 7a, 7b, 7c caused by reflecting surfaces 51, 52, 53, 54, 55. Each indirect communication path 7a, 7b, 7c can be assumed as being independent. Thus, each indirect communication path 7a, 7b, 7c can be treated as going through a frequency non-selective slow fading channel. The probability that all communication paths 7a, 7b, 7c become weak or are interrupt completely at the same time is small. Thus, a communication path diversity gain can be achieved.

If one strong line-of-sight (LOS) or no-line-of-sight (NLOS) communication path 7a, 7b, 7c is intercepted, another communication path 7a, 7b, 7c still can be used to guarantee the functionality of the communication system 0 as a whole.

When the attenuation of one or plural of the communication paths 7a, 7b, 7c is large, i.e., when one or plural of the communication paths 7a, 7b, 7c are in a deep fade, errors occur in reception and diversity techniques can be used to improve the performance.

According to the above-described preferred embodiment of the inventive communication system several replicas of the same information signal are transmitted to a receiving station 1, 2 over independently fading communication paths 7a, 7b and 7c. Thus, the probability that all the signal components of the information signal will fade simultaneously is considerably reduced.

Those signals from independently fading communication paths 7a, 7b and 7c can be coherently combined to realize the spatial diversity Each pair of narrow beam antennas 31, 32, 33, 41, 42, 43 can be treated as one finger of the RAKE receiver in spread spectrum systems, which can be adjusted based on the dynamic wireless environment. From a transmitting (Tx) side of the inventive communication system 0 (in the present embodiment the first station 1), only one transmitting chain is used and connected with several sending narrow beam antennas 31, 32 and 33. From a receiving (Rx) side (in the present embodiment the second station 2), each receiving narrow beam antenna 41, 42, 43 is connected to one receiving chain directly or preferably by a switch network. By using a switch network the number of required receiving chains can be reduced and can be adapted to the diversity order.

In comparison to smart antenna communication systems of the prior art the present invention permits the usage of narrow beam steering antennas 31, 32, 33, 41, 42, 43 on both sides of the communication path and thus on both the sending and the receiving side (stations 1 and 2). This reduces the multi-path fading effect and allows wireless communication at a high data-rate. Furthermore, in common systems a communication under non-line-of-sight conditions is only achieved by utilising wide beam antennas. The inventive communication system 0 achieves communication with high data rate under non-line-of-sight conditions by using narrow beam antennas.

According to the preferred embodiment said first and second stations 1, 2 further comprise first and second sensors 10, 11 for determining a receive signal strength indicator RSSI value of a signal received via a certain communication path 7a, 7b, 7c by using a certain narrow beam antenna 31, 32, 33, 41, 42, 43.

The respective receive signal strength indicator RSSI values determined by said sensors 10, 11 for a certain narrow beam antenna 31, 32, 33, 41, 42, 43 for a certain communication path 7a, 7b, 7c are stored in first and second RSSI matrixes 14, 15 in first and second memories 12, 13. Said first and second memories 12, 13 are connected to said sensors 10, 11 of said first and second stations 1, 2, respectively.

According to an alternative embodiment (not shown in the figures), both stations use only one common memory.

By using the RSSI values of the respective first and second RSSI matrixes 14, 15 stored in the respective first and second memories 12, 13, the first and second station 1, 2 are adapted to distinguish between a direct communication path 7d established by a pair of first and second narrow beam antennas 31, 41 and an indirect communication path 7a, 7b, 7c established by another pair of first and second narrow beam antennas 32, 33, 42, 43.

Moreover, the first and second stations 1, 2 are adapted to determine a relative distance between a respective narrow beam antenna 31, 32, 33, 41, 42, 43 used for a direct communication path 7d and a respective narrow beam antenna 31, 32, 33, 41, 42, 43 used for an indirect communication path 7a, 7b, 7c. This is performed by using the respective first and second RSSI matrix 14, 15 stored in the first and second memories 12, 13, too.

Furthermore, said first and second stations 1, 2 comprise first and second controllers 16, 17 for replacing a disturbed direct communication path 7d by using first and second narrow beam antennas 31, 32, 33, 41, 42, 43 having a high RSSI and a low relative distance to the respective narrow beam antenna 31, 32, 33, 41, 42, 43 used for the disturbed direct communication path 7d.

By using said first and second controllers 16, 17 the first and second station 1, 2 are further adapted to replace a disturbed indirect communication path 7a, 7b, 7c by using first and second narrow beam antennas 31, 32, 33, 41, 42, 43 having a high RSSI and a middle or high relative distance to the respective narrow beam antenna 31, 32, 33, 41, 42, 43 used for the disturbed direct communication path 7d. In this respect, a minimum reference distance can be defined to distinguish between a "low" and a "mid or high" distance. Replacement of disturbed or interrupted communication paths will be explained in detail by reference to the inventive communication method.

To distinguish between a direct communication path 7d and an indirect communication path 7a, 7b, 7c and to perform the replacement of a disturbed communication path, the first and second stations are provided with suitable microcontrollers.

Figure 2B:
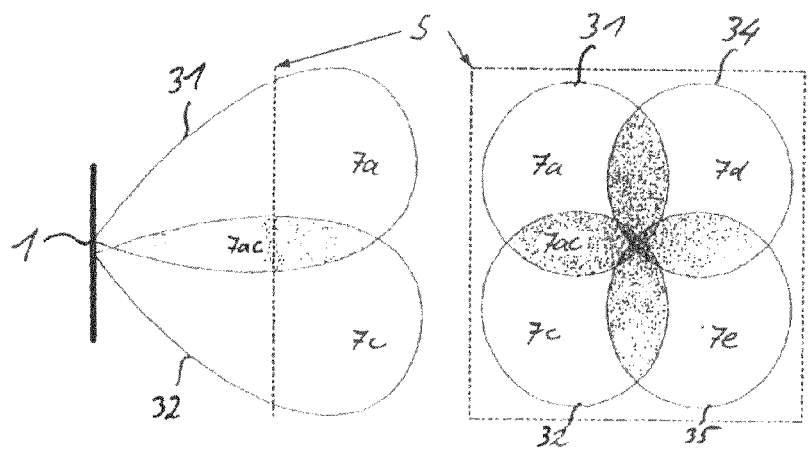

FIGS. 2A, 2B schematically show a side-view respectively front-view of a cross section along the axis S through four beams of four communication paths 7a, 7c, 7d, 7e.

As it is obvious from the FIGS. 2A and 2B the beams emitted by the plural first narrow band antennas 31, 32 of the first station 1 are not necessarily separated completely, but might overlap. This is symbolised by the reference number 7ac of FIG. 2B.

Figure 3:
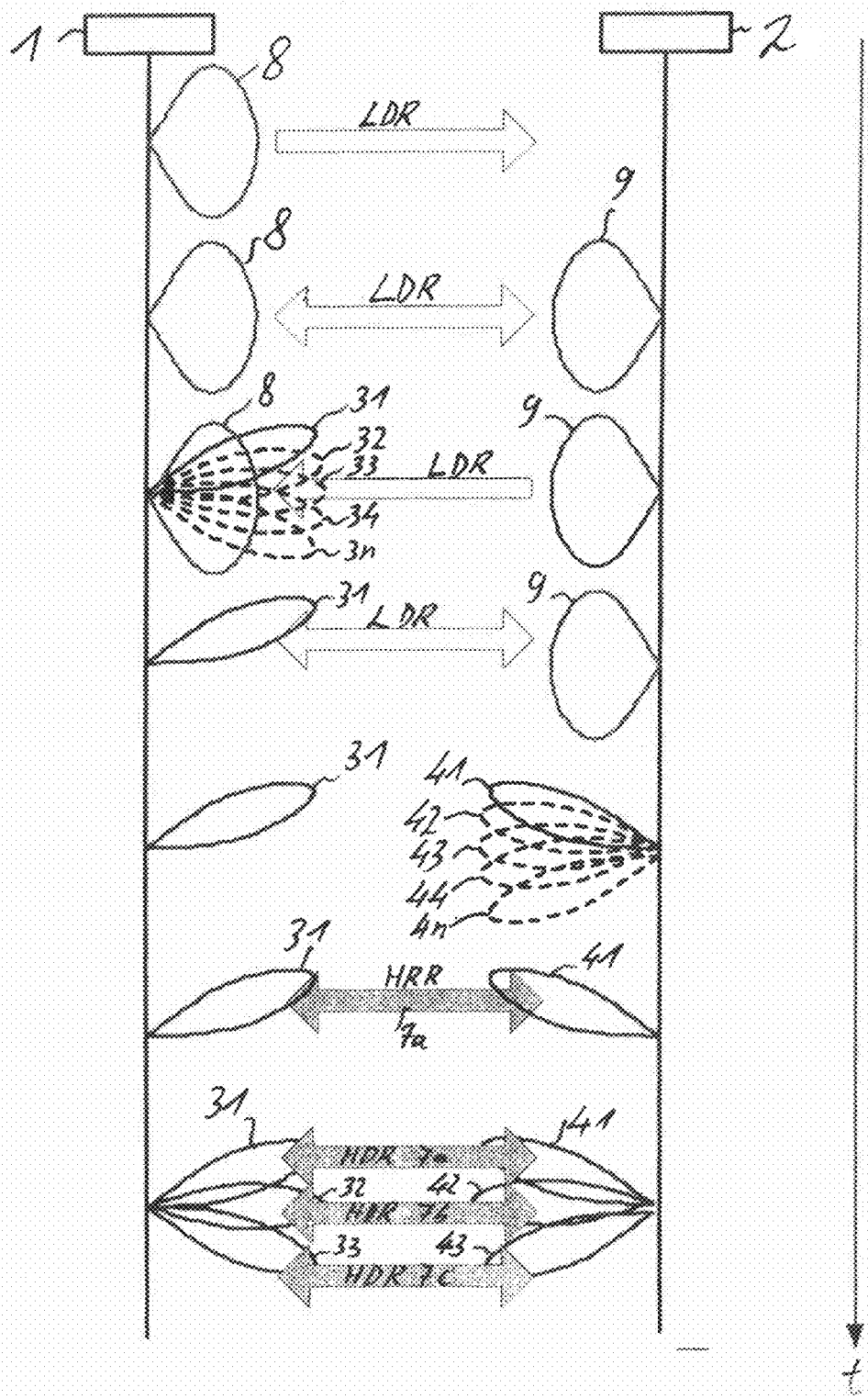
FIG. 3 is a flowchart showing different states of the inventive communication system when initially establishing communication paths.

FIG. 3 is a flowchart showing different states of the inventive communication system when initially establishing communication paths 7a, 7b, 7c and 7d.

Further to the above described preferred embodiment, a first wide beam antenna 8 is connected to the first station 1 and a second wide beam antenna 9 is connected to said second station 2.

In the present embodiment, an adaptive antenna array is used as first and second narrow beam antennas 31, 32, 33, 34, 41, 42, 43, 44.

Figures 4A, 4B:
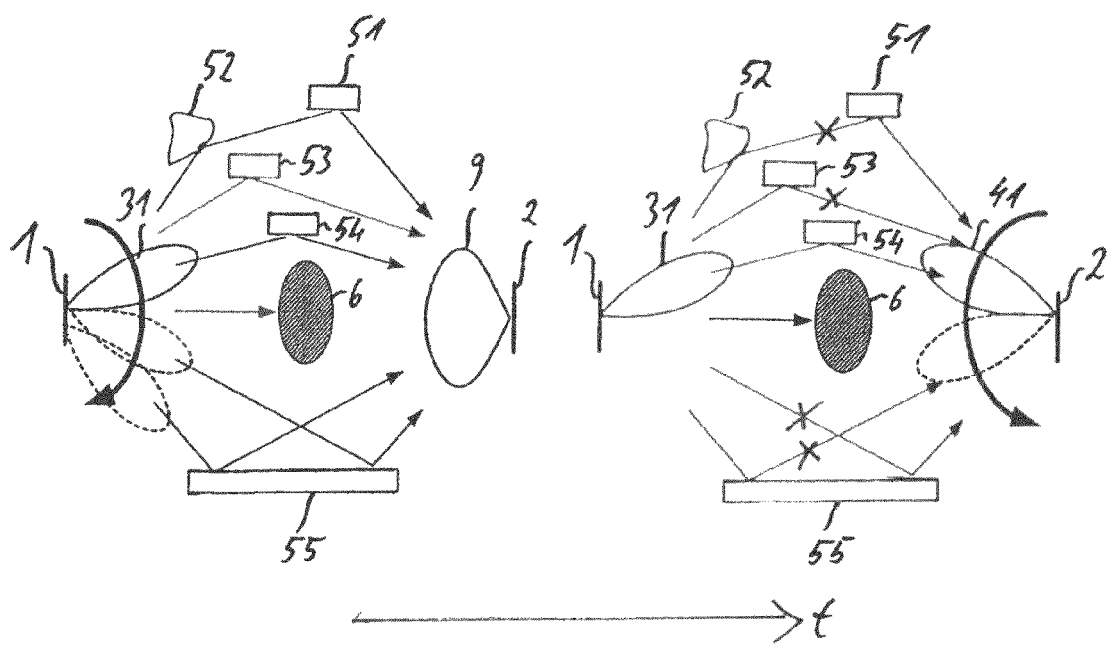
FIGS. 4A, 4B schematically show different states of the inventive communication system when establishing communication paths if steering narrow beam antennas are used.

According to an alternative embodiment shown in FIGS. 4A, 4B, steering antennas are used as first and second narrow beam antennas 31, 32, 33, 34, 41, 42, 43, 44. In order to find all sufficient direct and indirect communication paths, it is necessary to search all possible combinations of positions of the first and second antennas 31, 32, 33, 34, 41, 42, 43, 44. If the scanning range is 100°, for example and the half power beam width of the narrow beam steering antennas 31, 32, 33, 34, 41, 42, 43, 44 is 20° the number of choices from each the first station 1 side and the second station side is 5*5=25 and the total number of combinations for both of sides is 25*25=625.

For the initial establishment of a communication path the first and second wide beam antennas 8, 9 of the first and second station 1, 2 are used to find a respective opposite station 1, 2 and to agree on establishment of a preliminary communication path LDR. This preliminary communication path LDR has a low data rate, only. Since the data rate is low, the channel distortion is negligible.

After the preliminary communication path LDR is established between the first and second wide beam antennas 8, 9 of the first and second stations 1, 2, the first station successively transmits a test signal with each of its first narrow beam antennas 31, 32, 33, 34. Only one first narrow beam antenna 31, 32, 33, 34 of the first station 1 is used at the same time.

The opposite second station 2 determines a receive signal strength indicator RSSI value for each test signal. This determined receive signal strength indicator RSSI values are feedback by the second station 2 to the first station 1 by utilising the second wide beam antenna 9 and the respective first narrow beam antenna 31, 32, 33 and 34.

In case that steering narrow beam antennas are used as it is shown in FIGS. 4A, 4B, a beam direction of said antennas is steered until the second station 2 determines the highest receive signal strength indicator RSSI value. If the scanning range is 100° and the half power beam width of the narrow beam antenna is 20°, the number of choices is only 5*5=25.

Based on said receive signal strength indicator RSSI values the first station 1 generates a first RSSI matrix 14, wherein each RSSI value belongs to a first narrow beam antenna 31, 32, 33, 34 of the first station. Said first RSSI matrix 14 is stored in the first memory 12 of the first station 1.

Afterwards, the first station 1 selects the first narrow beam antenna 31 that previously provided the strongest test signal to the second station 2 by using said first RSSI matrix 14.

If the first station 1 uses a steering narrow beam antenna as it is shown in FIGS. 4A, 4B, the beam position of said steering narrow beam antenna is selected in correspondence with the position that previously provided the strongest test signal to the second station 2.

By using said selected first narrow beam antenna 31 the first station 1 is adapted to transmit and receive data to/from the second station 2. Thus, the first and second wide beam antennas 8, 9 are no longer necessary.

Afterwards the second station 2 starts to switch through its narrow beam antennas 41, 42, 43, 44 to receive test signals send by the first station 1 via said selected first narrow beam antenna 31.

The second station 2 determines a receive signal strength indicator RSSI value for each test signal received from the first station 1. Based on these RSSI values the second station 2 generates a second RSSI matrix 15 and stores said second RSSI matrix 15 in the second memory 13. Thus, in addition to the test signal no information exchange between the first station 1 and the second station 2 is required at this stage of the procedure.

If the second station 2 uses steering narrow beam antennas as it is shown in FIGS. 4A, 4B, a beam position of said steering narrow beam antennas is rotated until the second station 2 determines the highest receive signal strength indicator RSSI value. If the scanning range is 100° and the half power beam width of the narrow beam antenna is 20°, the number of choices at is also 5*5=25.

Alternatively, the second station 2 itself might send a test signal to the first station 1 by switching through its second narrow beam antennas 41, 42, 43, 44. The opposite first station 1 determines a receive signal strength indicator RSSI value for each test signal and feedbacks said RSSI values to the second station 2 by utilising the selected first narrow beam antenna 31. Based on the received RSSI values the second station 2 generates a second RSSI matrix 15 and stores said second RSSI matrix 15 in the second memory 13.

The second narrow beam antenna 41 with the best RSSI value according to the second RSSI matrix 15 is selected by the second station 2 to establishes a first high data rate (HDR) (preferably over 1 Gbps) communication path 7a to the first station 1.

In addition to this first (primary) communication path 7a, which most probably is the direct communication path in line-of-sight scenarios, the first and second stations 1, 2 automatically establish at least one additional further (secondary) communication path 7b, 7c by using the obtained first and second RSSI matrices 14, 15 and further first and second narrow beam antennas 32, 33, 42, 43, respectively. Said further communication paths 7b, 7c are chosen in a way that they are spatially different from said first communication path 7a and from one another.

As soon as a sufficient number of communication paths between the first and second station 1, 2 has been established, the inventive communication system 0 switches into a tracking phase. Due to the movement of the first and/or second stations 1, 2 or of reflecting surfaces 51, 52, 53, 54, 55, some strong communication paths 7a, 7b, 7c may be disturbed or blocked and thus fall below a predefined RSSI threshold value.

It is preferred that at least one pair of narrow beam antennas from both the first and second station 1, 2 continuously or regularly is used to update the first and second RSSI matrix to detect new strong communication paths. If a new strong communication path is detected, an existing weaker communication path automatically is replaced by the inventive communication system 0.

FIGS. 4A, 4B basically correspond to FIG. 3.

FIGS. 4A, 4B schematically show different states of the inventive communication system 0 in case the first and second antennas 31, 41 of the first and second stations 1, 2 are manual or mechanical steering narrow beam antennas. It is noted that only one steering narrow beam antenna 31, 32 of each the first and second station 1, 2 is shown in FIGS. 4A, 4B. Nevertheless it is clear from the present invention that each station 1, 2 is provided with at least two narrow beam antennas.

Figure 5:
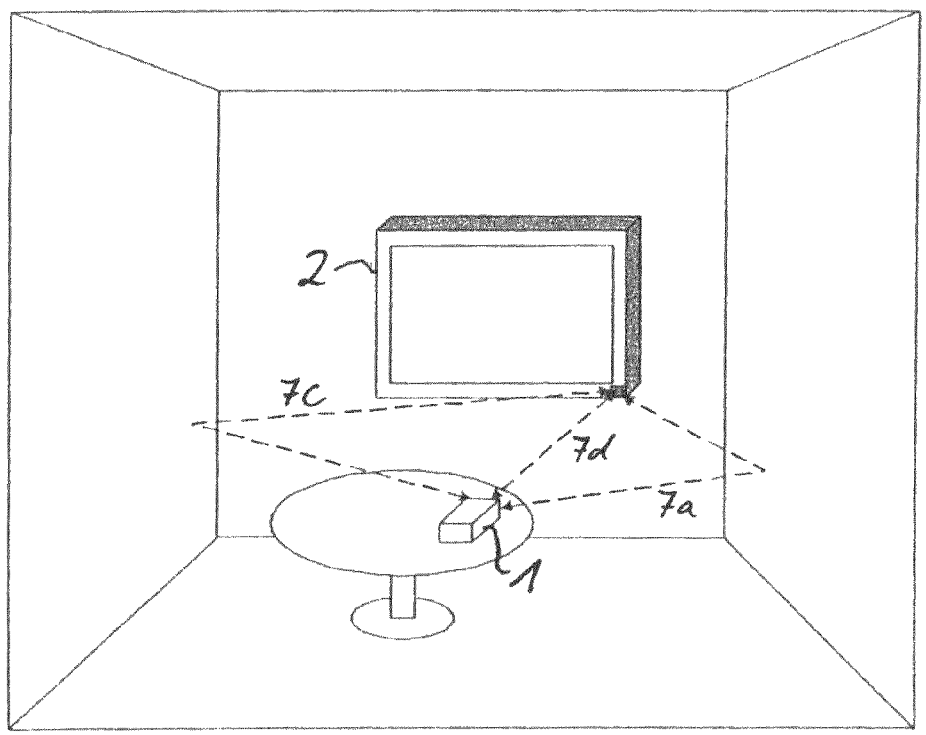
FIG. 5 schematically shows a typical indoor environment for the inventive communication system according to the preferred embodiment.

FIG. 5 schematically shows a typical indoor environment for the inventive communication system 0 according to the above preferred embodiment.

In FIG. 5, the first station 1 is a digital non-optical projector for transmitting picture and sound data to the second station 2 being a LCD monitor. Thus, the digital non-optical projector 1 is a wireless content provider for the LCD monitor 2.

Both the digital non-optical projector 1 and the LCD monitor 2 are quasi-stationary. Only the non-optical projector 1 might be moved occasionally. The LCD monitor 2 is fixed to the wall.

Figure 6:
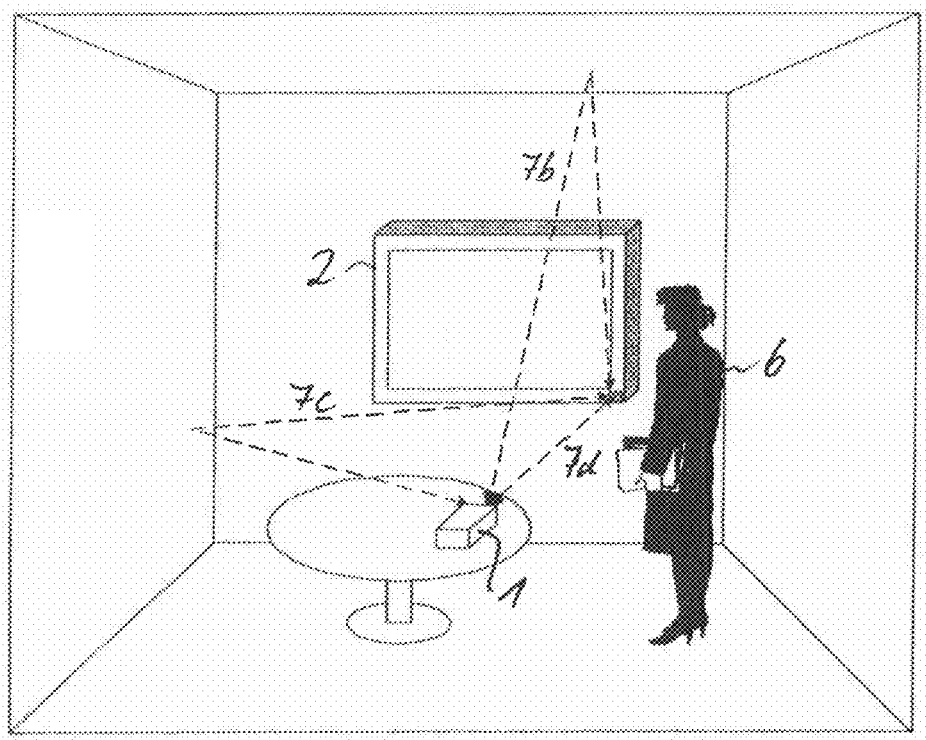
FIGS. 6, 7 schematically explain typical disturbances of communication paths of the inventive communication system.
Figure 7:
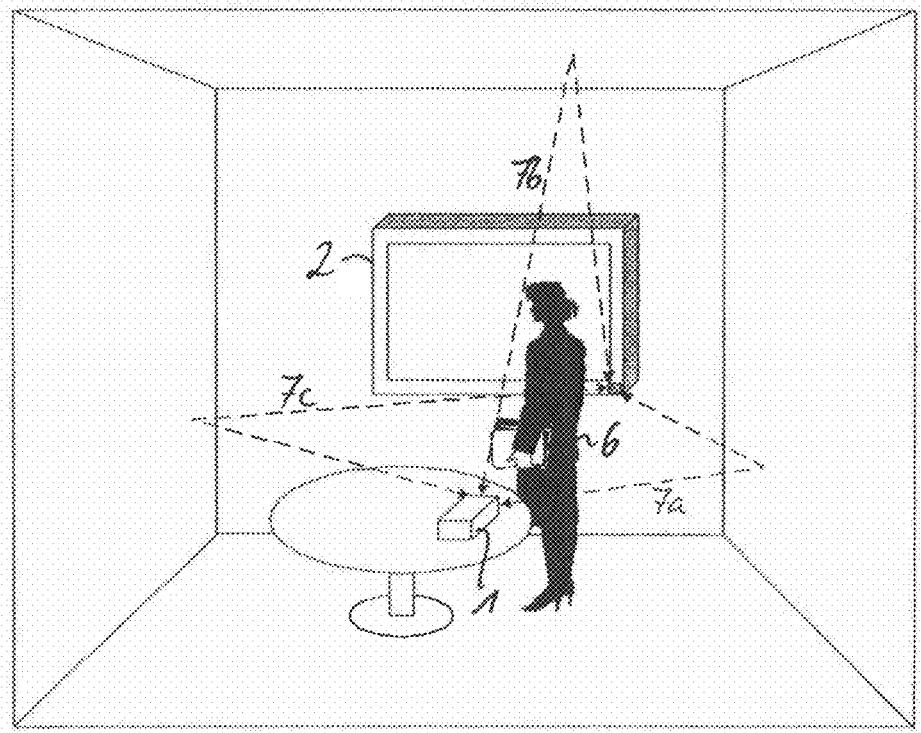

In this scenario, a loss of a communication path 7a, 7c, 7d is most probably initiated by an appearing obstacle 6, e.g. a moving person, as it is shown in FIGS. 6 and 7.

One direct communication path 7d and two indirect communication paths 7a, 7c are provided to guarantee wireless communication between the first station 1 and the second station 2. In consequence it is unlikely that all communication paths 7a, 7c, 7d are interrupted due to an appearing obstacle 6 at the same time.

In FIG. 5 bi-directional wireless communication using a transmission frequency of about 60 GHz is performed by the first and second station 1, 2, respectively.

It is obvious from FIG. 5 that the inventive communication system 0 works especially well with indoor environments due to the high number of reflecting surfaces and the resulting high number of possible spatially separated communication paths.

FIGS. 6, 7 schematically explain typical disturbances of communication paths of the inventive communication system in the typical indoor environment shown in FIG. 5.

In FIG. 6 a person 6 enters the indoor environment and causes a loss of the indirect communication path 7a. This disturbed indirect communication path 7a instantly is replaced by the inventive communication system 0 by a new indirect communication path 7b. If the disturbed indirect communication path 7a cannot be replaced, still two working communication paths 7d, 7c are available. Thus, an interruption of the communication and a decrease of the data transmission rate is avoided.

FIG. 7 shows a non-line-of-sight situation that occurs when the person 6 moves in-between the first and second stations 1, 2. In consequence, only indirect communication paths 7a, 7b, 7c are provided. Although the direct communication path 7d is lost, the data transmission rate is maintained due to the presence of indirect communication paths 7a, 7b and 7c.

Although the communication system 0 according to the above described preferred embodiment comprises a first station 1 comprising three first narrow beam antennas 31, 32, 33 and a second station 2 comprising three second narrow beam antennas 41, 42, 43, each it is within the scope of the present invention that both the first station 1 and the second station 2 comprise one single first and second narrow beam antenna 41, 31, each.

In this case, said first and second stations 1, 2 are adapted to automatically establish at least one alternative communication path 7b, 7c for wireless communication via said first and second narrow beam antennas 31, 41, wherein said alternative communication path 7b, 7c is spatially different from said first communication path 7a.

Establishment of said alternative communication path is performed by changing the respective steering direction (orientation) of said first and second narrow beam antennas 31, 41. Thus, said first and second narrow beam antennas 31, 41 have to be steerable antennas (e.g. antenna arrays, smart antennas, or antennas having a motor), respectively.

Thus, it is guaranteed that a new communication path 7b or 7c is automatically generated in case the first communication path 7a is disturbed.

Figure 8:
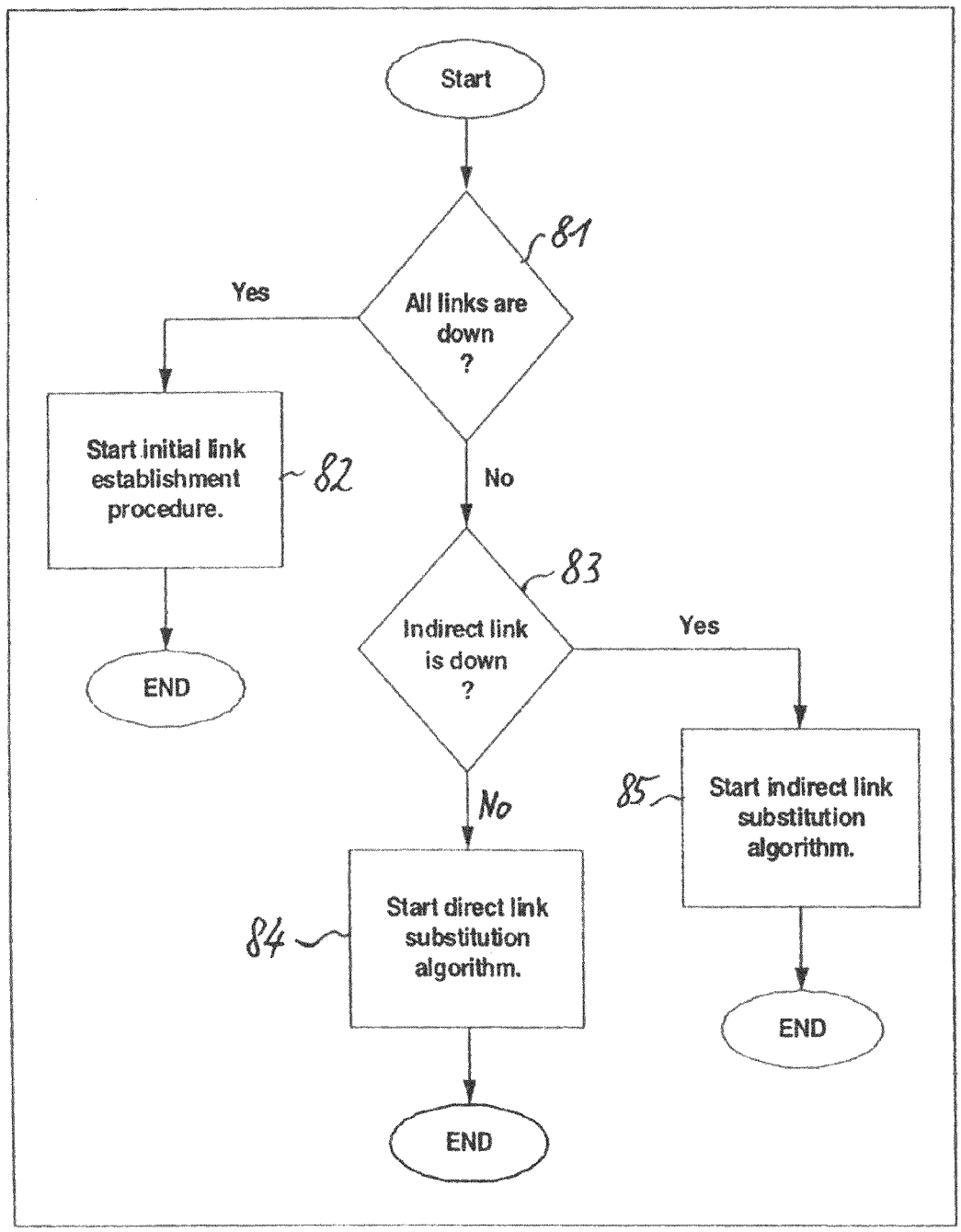
FIG. 8 shows a flow diagram of a first aspect of the inventive communication method.
Figure 9:
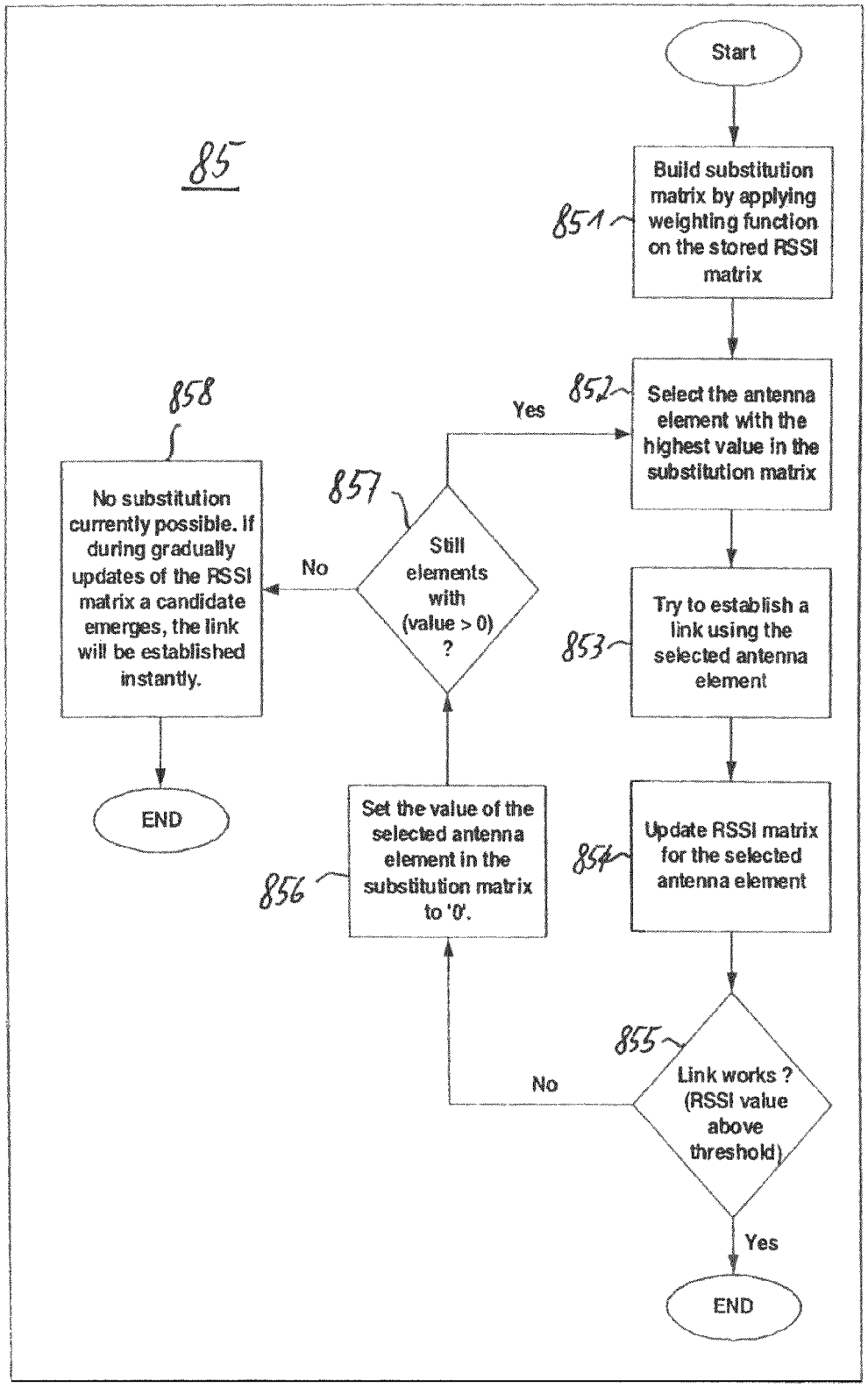
FIG. 9 shows a flow diagram of a second aspect of the inventive communication method.
Figure 10:
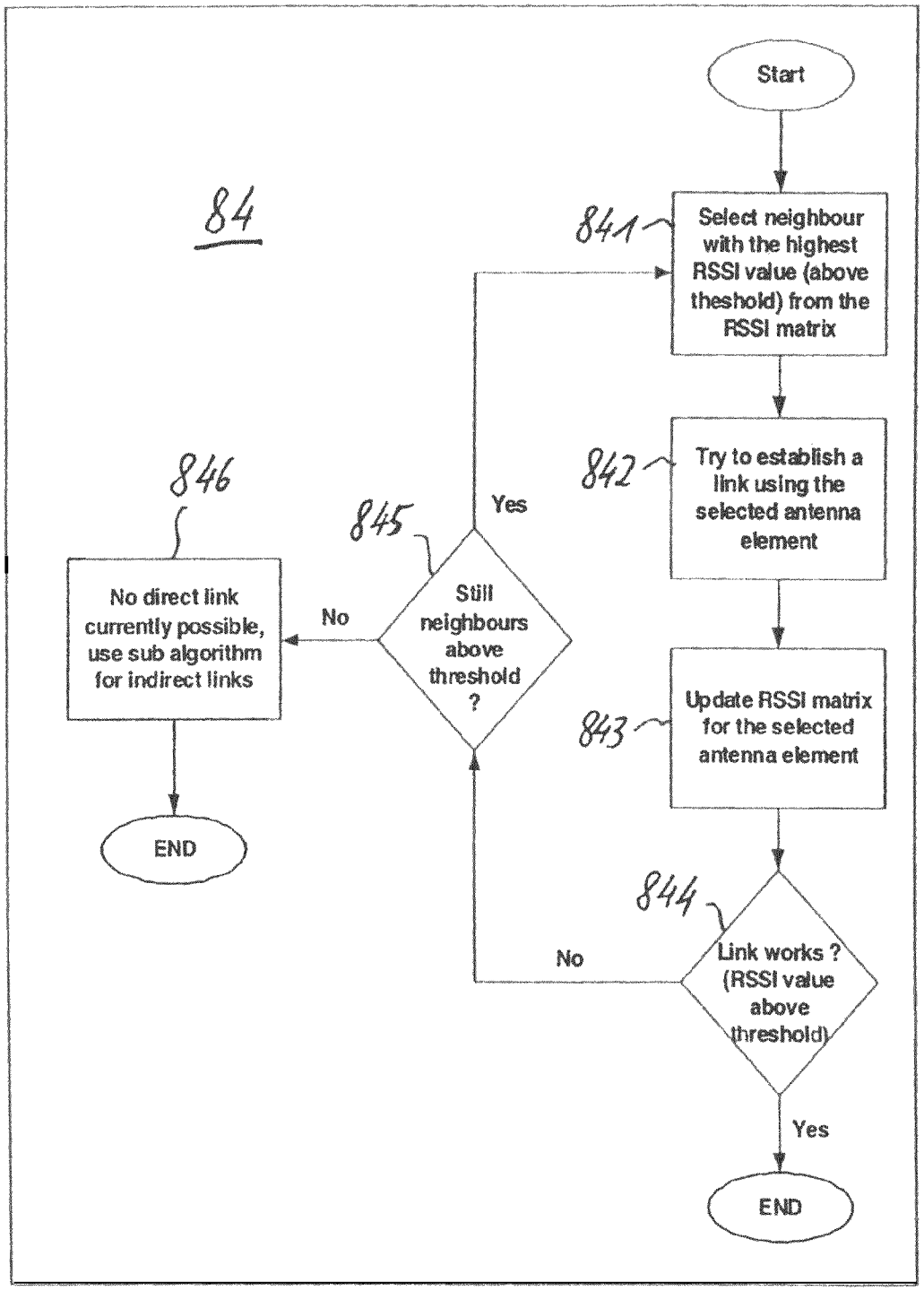
FIG. 10 shows a flow diagram of a third aspect of the inventive communication method.

FIGS. 8, 9 and 10 show different aspects of a preferred embodiment of the inventive communication method.

In general, the inventive communication method for providing wireless communication between a first station 1 and a second station 2 comprises the steps of:

Establishing a primary communication path 7a, 7d via a first narrow beam antenna 31 of said first station 1 and a second narrow beam antenna 41 of said second station 2, establishing at least one secondary communication path 7b, 7c via another first narrow beam antenna 32, 33; 32, 33, 34, 3n of said first station 1 and another second narrow beam antenna 42, 43; 42, 43, 44, 4n of said second station 2, wherein said other first and second narrow beam antennas 32, 33, 42, 43; 32, 33, 34, 3n, 42, 43, 44, 4n are chosen in a way that said at least one secondary communication path 7b, 7c is spatially different from said primary communication path 7a, 7d and performing wireless communication between said first and second station 1, 2 via said primary communication path 7a, 7d and/or said at least one secondary communication path 7b, 7c.

The step of establishing a primary communication path 7a, 7d and the step of establishing at least one secondary communication path 7b, 7c has already been explained in detail with respect to FIG. 3.

FIG. 8 displays a substitution algorithm that takes place when a communication path 7a, 7b, 7c, 7d goes down.

According to the substitution algorithm in a first step 81 it is checked whether all communication paths (links) are down.

If all communication paths are down an initial communication path establishment procedure is started in step 82 and the substitution algorithm is terminated. This initial communication path establishment procedure has already been explained in detail with respect to FIGS. 3, 4A and 4B.

If at least one communication path is maintained it is checked in the following step 83 whether an indirect communication path is down.

If so, an indirect communication path substitution algorithm is stated in the following step 85 and the substitution algorithm is terminated.

If no indirect communication path is down, a direct communication path substitution algorithm is stated in step 84 and the substitution algorithm is terminated.

Thus, in case a communication path goes down at a point in time, (e.g. due to an appearing obstacle 6) the substitution algorithm checks if the broken communication path is an indirect or and direct communication path to perform the appropriate sub-algorithm.

Therefore, the two main components of this substitution algorithm are the indirect communication path substitution sub-algorithm 85 and the direct communication path substitution sub-algorithm 84. These substitution sub-algorithms are shown in detail in FIGS. 9 and 10, respectively.

In the present embodiment the above substitution algorithm is started automatically as soon as a link loss is detected during the regular RSSI measurements.

The indirect communication path substitution sub-algorithm 85 is shown in more detail in FIG. 9.

In a first step 851 of the indirect communication path substitution sub-algorithm 85 a weighting function is applied on the RSSI values stored in the first and second RSSI matrix 14, 15 to create a substitution matrix. The purpose of the weighting function is to avoid neighbouring beams to the direct communication path, i.e. additional line-of-sight communication paths.

For example, in FIGS. 2A, 2B four neighbouring beams emitted by narrow beam antennas 31, 32, 34, 35 are displayed. In order to cover the whole area there frequently are some overlaps of the communication paths 7a, 7c, 7d and 7e of the respective narrow beam antennas 31, 32, 34, 35. Such an overlap is for example area 7ac. The cross-section of the four communication paths 7a, 7c, 7d and 7e shows that there are several of these overlaps. If the second station 2 is located within one of these overlaps, the measured RSSI values of the adjacent beams of adjacent communication paths 7a, 7c, 7d, 7e will have almost the same high RSSI value. In consequence it is possible that all narrow beam antennas with the highest RSSI values belong to basically one line-of-sight communication path. In case an obstacle 6 moves in-between the first and second station 1, 2 there is a high risk said all line-of-sight communication paths are disturbed at the same time.

Thus, in order to find a narrow beam antenna for establishing an indirect communication path, i.e. non-line-of-sight communication path, it is not sufficient to consider the RSSI values, only.

To overcome this problem, a weighting function is used. The weighting function adds some additional value to the measured RSSI values, depending on a relative distance of a respect narrow beam antenna to a narrow beam antenna currently used for a direct communication path. Those narrow beam antennas are favoured for establishing a new indirect communication path, which have both a high RSSI value in the respective first and second RSSI matrix and also some distance to said narrow beam antenna currently used for said direct communication path. In consequence, the weighting function bases on a determination of a relative distance between a respective first/second narrow beam antenna used for a direct (primary) communication path and unused first/second narrow beam antennas intended for the establishment of new indirect communication paths.

It is obvious that the creation of the substitution matrix by applying the weighting function on the first and second RSSI matrix 14, 15 alternatively can be performed before an indirect communication path goes down. Since it is preferred that the first and second stations 1, 2 gradually update their corresponding first and second RSSI matrix 14, 15 by measurements of RSSI values, it is also preferred to update the substitution matrix at the same time. This parallel update of both the RSSI matrix and the substitution matrix speeds up a subsequent search for new indirect and direct communication paths significantly.

In the following step 852 a pair of first and second narrow beam antennas with the highest values in the substitution matrix is chosen.

Afterwards, in step 853 it is tried to establish a communication path via said chosen pair of narrow beam antennas. This is performed by updating the corresponding RSSI value of said chosen narrow beam antennas in the respective first/second RSSI matrix 14, 15 in step 854.

In step 855 it is decided whether the measured RSSI values reach a predefined threshold value and thus are sufficiently high to justify use of the chosen pair of narrow beam antennas for establishment of a new indirect communication path.

If the measured RSSI values reach said predefined threshold value the new indirect communication path is established by using said chosen pair of narrow beam antennas and the method is terminated.

If one or both of the measured RSSI values are below said predefined threshold value the corresponding values in the respective substitution matrix are set to '0' to mark this previously chosen pair of narrow beam antennas as ineligible in step 856.

In the following step 857 it is decided if there still exist narrow beam antennas (elements) with a value >0 in the substitution matrix.

If so, the method loops to step 852 and selects the pair of narrow beam antenna with the highest value in the substitution matrix. Thus, the algorithm tests the remaining narrow beam antennas, in sequence of their values in the substitution matrix until an appropriate pair of narrow beam antennas is found or not further suitable narrow beam antennas exist.

If it is decided in step 857 that no narrow beam antennas with a value >0 exists in the substitution matrix, it is currently not possible to replace the broken indirect communication path and the substitution is postponed in step 858.

If during the regular gradual update of the RSSI matrix a possible narrow beam antenna or pair of narrow beam antennas for a replacement emerges, i.e. has an RSSI value above a certain threshold, the communication path is established instantly by the above described indirect communication path substitution sub-algorithm 85.

The direct communication path substitution sub-algorithm 84 is shown in more detail in FIG. 10.

This direct communication path substitution sub-algorithm 84 works slightly different from the indirect communication path substitution sub-algorithm 85. Instead of a substitution matrix, the RSSI matrix 14, 15 is used directly.

In a first step 841, it is checked if one of the narrow beam antennas next to a respective narrow beam antenna formally used for the broken direct communication path can be used as a replacement. Thus, the pair of neighbouring first and second narrow beam antenna with the highest RSSI value is selected (provided that the RSSI value is above the predefined minimum threshold).

Afterwards, in step 842 it is tried to establish a new direct communication path.

During this procedure the RSSI values of the chosen pair of narrow beam antennas is measured and the respective first/second RSSI matrix 14, 15 is updated in step 843.

In step 844 it is decided whether the measured RSSI values reach the predefined minimum threshold.

If the measured RSSI values reach the predefined minimum threshold the chosen pair of narrow beam antennas is used for the established new direct communication path and the sub-algorithm is terminated.

If the measured RSSI values are below the predefined minimum threshold it is tested in step 845 whether other eligible narrow beam antennas neighbouring the narrow beam antenna formally used for the disturbed direct communication path exist.

If other eligible narrow beam antennas neighbouring the narrow beam antenna previously used for the disturbed direct communication path exist the method loops to step 841 and selects the pair of neighbouring first and second narrow beam antennas with the highest RSSI value in the corresponding RSSI table 14, 15.

If no other eligible narrow beam antennas neighbouring the narrow beam antenna previously used for the disturbed direct communication path exist it is currently not possible to replace the broken direct communication path with a new direct communication path adjacent to the old direct communication path.

In consequence, the indirect communication path substitution sub-algorithm 85 is entered in step 846 and the direct communication path substitution sub-algorithm 84 is terminated.

According to another preferred embodiment a pair of narrow beam antennas previously used for the disturbed direct communication is tested more frequently for establishing a new direct communication path than other first and second narrow beam antennas of the first and second stations.

If during the regular updates of the RSSI matrixes 14, 15 a possible new direct communication path emerges, i.e. measured RSSI value or narrow beam antennas are considerably higher than the RSSI values of other narrow beam antennas in the RSSI matrix an indirect communication path automatically is replaced by a new direct communication path.

The communication path substitution algorithm of FIGS. 9, 10 bases on the fact that in a quasi-static indoor environment the indirect communication paths will work almost all the time, since the reflecting surfaces 51, 52, 53, 54, 55 as well as the first and second stations 1, 2 will not move very often.

Furthermore, a lost communication path 7a, 7b, 7c, 7d usually can be substituted by using the RSSI values previously stored in the first and second RSSI matrix 14, 15 in a short time.

As said before, in the first and second RSSI matrix 14, 15 each element belongs to a first and second narrow beam antenna 31, 32, 33, 34, 3n, 41, 42, 43, 44, 4n of the first and second stations 1, 2, respectively.

As it has been explained in detail by reference to FIG. 3 the RSSI matrix 14, 15 is created during the initial link establishment procedure 82 and is updated gradually during the communication. When a loss of a communication path 7a, 7b, 7c, 7d is detected, the inventive communication method automatically checks the eligible (unused) narrow beam antennas 31, 32, 33, 34, 3n, 41, 42, 43, 44, 4n with respect to their corresponding RSSI values stored in the respective RSSI matrix 14, 15 to replace the disturbed communication path.

Due to said RSSI values stored in said first and second RSSI matrix the search for a suitable new communication path is accelerated significantly.

In this respect it is assumed that the measured RSSI values of narrow beam antennas used for a direct communication path are considerably higher than the measured RSSI value of narrow beam antennas used for an indirect communication path. According to the present invention this fact is used to distinguish direct communication paths form indirect communication paths.

In summary, both an acquisition and tracking algorithm are proposed to facilitate the steering of narrow beam antennas during the acquisition of communication paths. By using these algorithm the calculation complexity is significantly reduced.

Figure 11:
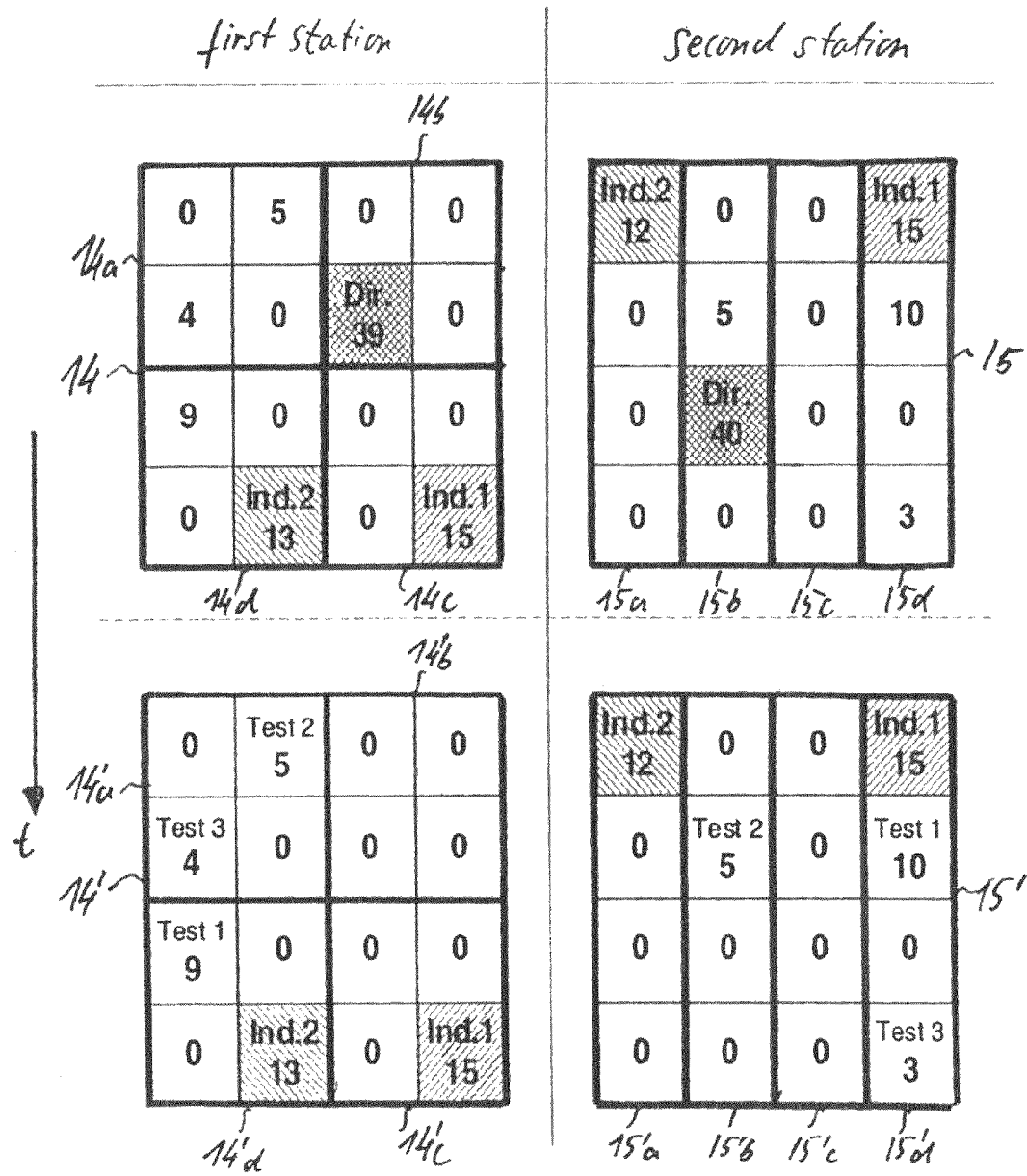
FIG. 11 shows an example of RSSI tables used according to a preferred embodiment of the present invention.
Figure 12:
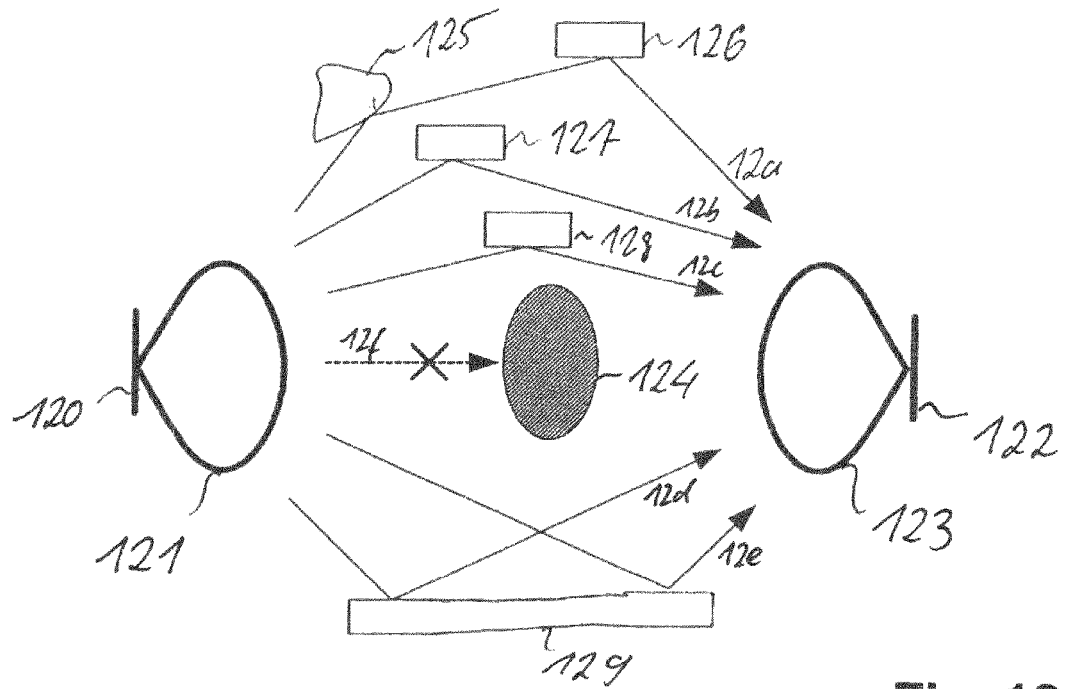
FIG. 12 schematically shows a communication system using wide beam antennas according to the prior art.
Figure 13:
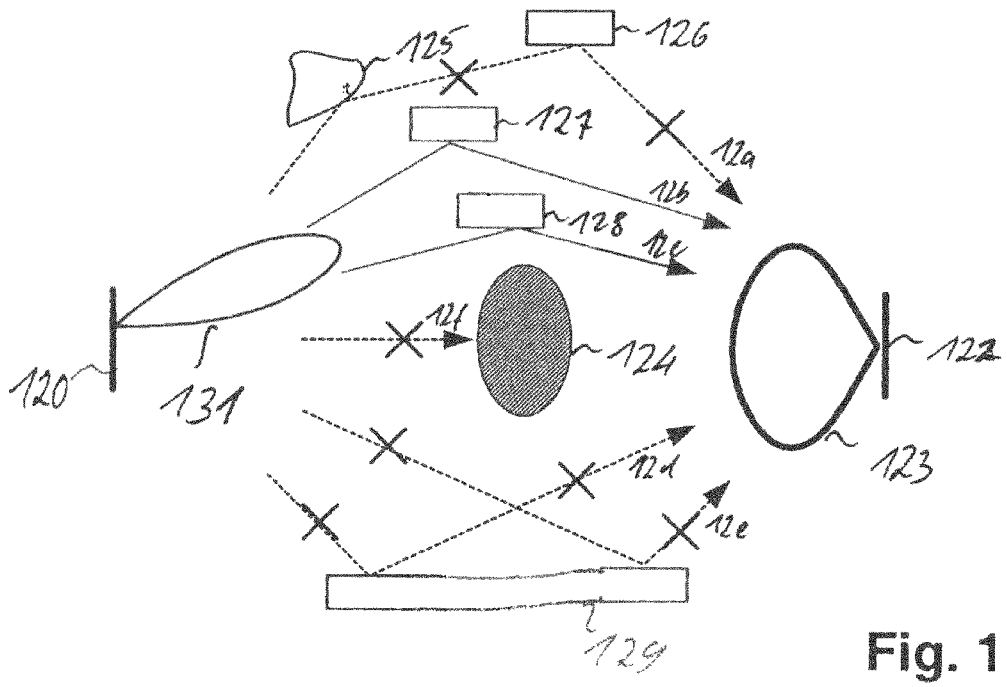
FIG. 13 schematically shows a communication system using both wide and narrow beam antennas according to the prior art.
Figure 14:
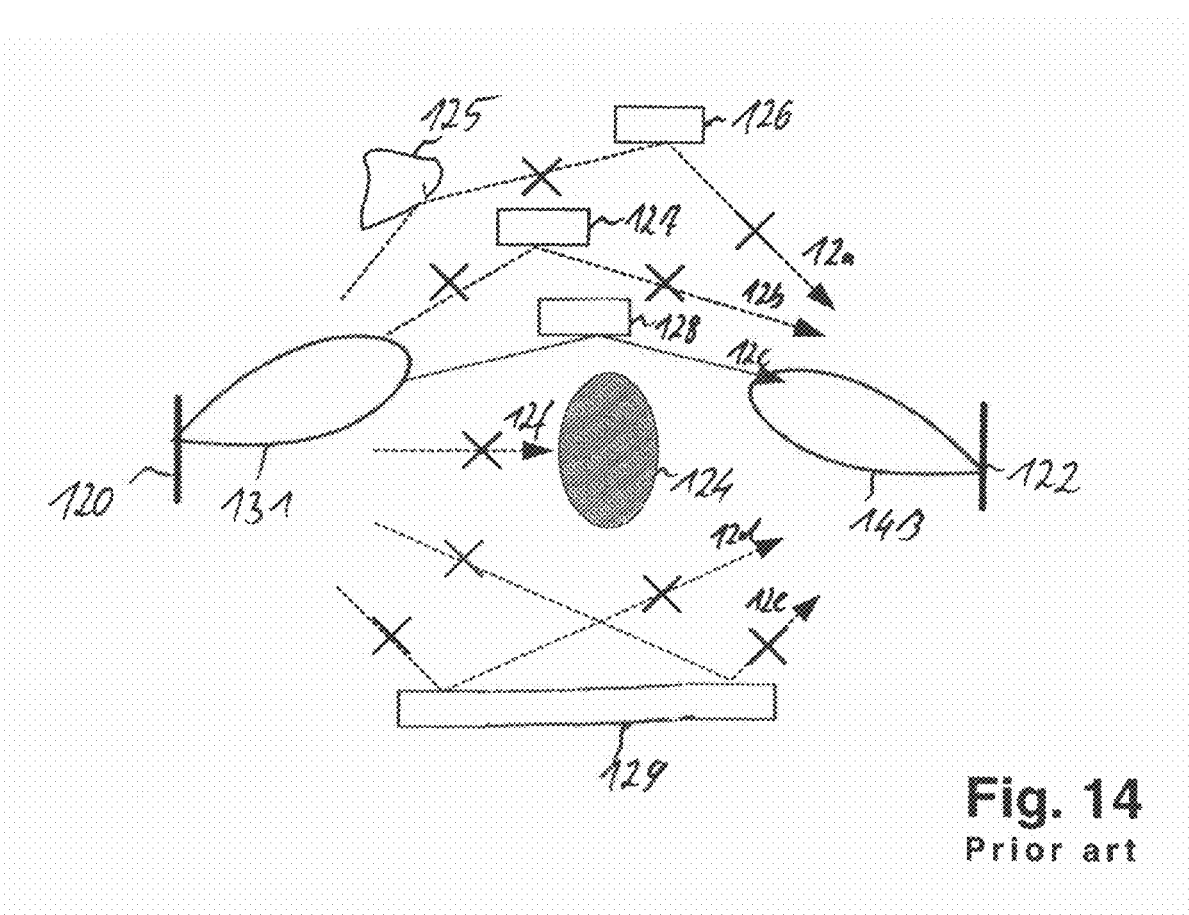
FIG. 14 schematically shows a communication system using narrow beam antennas according to the prior art.

FIG. 11 shows examples of RSSI tables 14, 15, 14', 15' used to replace broken communication paths 7a, 7b, 7c, 7d (links) according to the embodiment of FIGS. 4A, 4B.

Each RSSI table 14, 15, 14', 15' comprises a receive signal strength indicator value for each narrow beam antenna 31, 32, 33, 34, 3n, 41, 42, 43, 44, 4n of a respective station 1, 2.

Thus, according to the RSSI tables 14, 15, 14', 15' shown in FIG. 11, both the first and second station 1, 2 comprise 16 distinguishable narrow beam antennas.

According to an alternative embodiment not shown in the figures the first and second station comprise different numbers of narrow beam antennas. In consequence the respective first and second RSSI tables have different sizes.

In the present embodiment, some of the values of the RSSI tables 14, 15, 14', 15' relate to "virtual" narrow beam antennas and thus to different steering positions of one single narrow beam antenna as it is shown in FIGS. 4A, 4B.

Alternatively, all values of the RSSI tables may relate to "real" narrow beam antennas as it is shown in FIG. 3.

In the present embodiment, the first station 1 comprises four first steering narrow beam antennas 31, 32, 33, 34. Said first narrow beam antennas 31, 32, 33, 34 are arranged in a square and can be steered manually to four adjacent positions, each. Thus, four RSSI values of each subsection 14a, 14b, 14c and 14d relate to one narrow beam antenna 31, 32, 33, 34 of the first station 1, respectively.

Furthermore, in the present embodiment, the second station 2 comprises four steering narrow beam antennas 41, 42, 43, 44. Said narrow beam antennas 41, 42, 43, 44 are arranged in a horizontal line and can be steered mechanically to four vertical positions, respectively. Thus, four RSSI values of each column 15a, 15b, 15c and 15d relate to one narrow beam antenna 41, 42, 43, 44 of the second station 2, respectively.

Alternatively to steering antennas switched beam antennas or adaptive antenna arrays might be used. With respect to the embodiment shown in FIG. 11, the adaptive antenna array of both the first and second station would consist of 4.times.4 narrow beam antennas.

These RSSI tables 14, 15, 14', 15' are stored in the memories 12 and 13 of the respective first and second stations 1, 2 and thus on both sides of the communication paths.

As it is obvious from FIG. 11, the sections 14b and 15b of the RSSI tables 14 and 15 show the highest RSSI values "39" and "40", respectively. These RSSI values are significantly higher than the further RSSI values of the RSSI tables 14 and 15. In consequence it is assumed that these values belong to a direct communication path. Thus, the direct communication path is established via the first narrow beam antenna 32 relating to section 14b and the second narrow beam antenna 42 relating to section 15b.

Two further pairs of high RSSI values can be identified in the RSSI tables 14 and 15: A first pair of RSSI values "15" and "15" is found in sections 14c and 15d of the RSSI tables 14 and 15. These RSSI values are significantly lower than the highest RSSI value of the RSSI tables 14 and 15. Furthermore, a relative distance of the steering direction of the corresponding first and second narrow beam antennas 33 and 44 to the steering direction of the first and second narrow beam antennas 32 and 42 used for the direct communication path is above a predefined reference value and thus high. In consequence it is assumed that these values belong to an indirect communication path. Thus, a first indirect communication path is established via the first narrow beam antenna 33 relating to section 14*c* and the second narrow beam antenna 44 relating to section 15*d*.

A second pair of high RSSI values "13" and "12" is found in sections 14*d* and 15*a* of the RSSI tables 14 and 15. Based on the above-described criteria it is assumed that these values belong to a further indirect communication path. Thus, a second indirect communication path is established via the first narrow beam antenna 34 relating to section 14*d* and the second narrow beam antenna 41 relating to section 15*a*.

Summarising, RSSI tables 14 and 15 show a state of the inventive communication system 0 in which one direct communication path and two indirect communication paths have been established to connect the first and second station 1, 2.

If, for example, the direct communication path goes down (e.g. due to an appearing obstacle 6), the corresponding RSSI values become "0" as it is shown in the RSSI tables 14' and 15'. Since the indirect communication paths are maintained, the information transmission rate is not reduced due to the missing direct communication path.

To replace the disturbed direct communication path by a new communication path the RSSI tables 14 and 15 of the first and second station 1, 2 are compared to identify high pairs of RSSI values.

Firstly, a pair of RSSI values of "9" and "10" of sections 14'*d* and 15'*d* of the RSSI tables 14' and 15' is identified (see "Test 1"). Since the corresponding narrow beam antennas 34 and 44 of the first and second stations 1, 2 are currently used to establish a strong indirect communication path, this test is skipped.

Secondly, a pair of RSSI values of "5" and "5" of sections 14'*a* and 15'*b* of the RSSI tables 14' and 15' is identified (see "Test 2"). The corresponding narrow beam antennas 31 and 42 of the first and second stations 1, 2 are not used. The respective steering directions of the corresponding first and second narrow beam antennas 31 and 42 are adjacent to the respective steering directions of the first and second narrow beam antennas 32 and 42 that have been used for the interrupted direct communication path. In consequence, the relative distance to the respective narrow beam antennas 32 and 42 previously used for the direct communication path is very low. Thus, it is assumed that these RSSI values belong to a disturbed direct communication path. Nevertheless the communication path is tested. If the test results in RSSI values below a predefined threshold, no communication path is established. If the predefined threshold value is reached, a new direct communication path is established.

Thirdly, a pair of RSSI values of "4" and "3" of sections 14'*a* and 15'*d* of the RSSI tables 14' and 15' is identified (see "Test 3"). Since the corresponding narrow beam antennas 31 and 44 of the first and second stations 1, 2 are currently used to establish other indirect communication paths, this test is skipped.

Thus, the possible substitution communication paths are tested according to the decreasing RSSI values of the first and second narrow beam antennas in the first and second RSSI matrix, respectively.

If all tests are negative it is assumed that the position of the first or second station 1, 2 has changed significantly. In case all communication path go down a restart of the initial communication path establishment procedure is necessary.

Since it is not necessary to test all possible antenna configurations due to the usage of the RSSI tables 14, 15, there is a high probability to find a new communication path in a very fast and easy way.

In the above described preferred embodiment of the inventive method a second pair of first and second narrow beam antennas 32, 33, 34, 3*n*, 42, 43, 44, 4*n* is provided to establish said at least one secondary communication path 7*b*, 7*c* in addition to said primary communication path 7*a*, 7*d*. Wireless communication between said first and second station 1, 2 is performed via said primary communication path 7*a* and/or said at least one secondary communication path 7*b*, 7*c*.

Notwithstanding it is within the scope of the present invention to establish said secondary communication path 7*b*, 7*c* by using said first pair of first and second narrow beam antennas 31, 41, only. Thus, no further narrow beam antennas are required.

In this case said at least one alternative communication path 7*b*, 7*c* is established via said first narrow beam antenna 31 of said first station 1 and said second narrow beam antenna 41 of said second station 2. Similar to the above embodiment said at least one secondary communication path 7*b*, 7*c* has to be spatially different from said primary communication path 7*a*; 7*d*. Thus, said first and second antennas 31, 41 have to be steerable antennas.

In this respect it is obvious that interruption of the primary communication path 7*a*; 7*d* preferably is detected before said at least one alternative communication path 7*b*, 7*c* is established. The reasons is that establishment of the alternative communication path 7*b*, 7*c* automatically interrupts the primary communication path 7*a*; 7*d*. Thus, the alternative communication path 7*b*, 7*c* preferably is established only if said primary communication path 7*a*; 7*d* is not longer available. It is preferred that said alternative communication path 7*b*, 7*c* is established automatically if interruption of the primary communication path 7*a*; 7*d* is detected.

It is preferred that the above described method is implemented into a computer program product directly loadable into the internal memory of a microprocessor of an electronic equipment. Said computer program product preferably comprises software code portions for performing the steps of the above described method when said product is run by said microprocessor.

In this respect it is preferred if the computer program product is embodied on a computer readable medium.

In summary, the present invention discloses a wireless communication system and method especially suitable for indoor short-range applications. The inventive communication system and method guarantees a high data rate even for no line of sight (NLOS) user scenarios.

The main advantages in comparison to the prior art are that the inventive communication system and method reduces the negative effects of multi-path propagation like fading by using narrow beams and allows wireless communication at a high data rate without frequent interceptions even under non-line-of-sight conditions. Due to the usage of narrow beam antennas on both sides of the communication path it is not necessary to use complex and expensive equalisers. Furthermore, the maximum ratio combining effect results in a higher signal to noise ratio (SNR) compared to the prior art. Moreover, the inventive tracking algorithm of the inventive communication method provides a quick and efficient substitution of broken links.

The invention claimed is:

1. A communication system comprising:
   a first station comprising a plurality of first antennas providing a plurality of first antenna beam directions; and a second station comprising a plurality of second antennas providing a plurality of second antenna beam directions;
wherein said first and second stations are configured to establish a first communication path for wireless communication via a first one of said plurality of said first antennas and a first one of said plurality of said second antennas, and
said first and second stations are configured to find at least one alternative communication path for wireless communication via said first one of said plurality of first antennas and said first one of said plurality of said second antennas when the first communication path is blocked, said alternative communication path being different from said first communication path.

2. A communication system according to claim 1, wherein the first and second stations are configured to establish at least one further communication path for wireless communication via a second one of said plurality of first antennas and a second one of said plurality of said second antennas while maintaining said first communication path, said at least one further communication path being different from said first communication path.

3. A communication system according to claim 1, wherein said first station further comprises a first wide beam antenna and/or said second station further comprises a second wide beam antenna.

4. A communication system according to claim 1, wherein said first and second stations further comprise first and second sensors for determining a receive signal strength indicator RSSI value of a signal received via a certain communication path by using a certain antenna direction.

5. A communication system according to claim 4, wherein said first and second stations further comprise first and/or second memories for storing said receive signal strength indicator RSSI value determined for a certain pair of antenna beam directions for a certain communication path.

6. A communication system according to claim 5, wherein said receive signal strength indicator RSSI value determined for a certain antenna beam direction for a certain communication path is stored in first/second RSSI matrixes in said first and/or second memories, respectively.

7. A communication system according to claim 1, wherein said first station and/or said second station further comprise distinguishing means for distinguishing between a direct communication path and an indirect communication path established by a pair of first and second antenna beam directions.

8. A communication system according to claim 1, wherein said first station and/or said second station further comprise distinguishing means for distinguishing between a direct communication path established by a pair of first and second antenna beam directions and an indirect communication path established by another pair of first and second antenna beam directions.

9. A communication system according to claim 1, wherein said first and second stations further comprise determining means for determining a relative distance between a respective antenna beam direction used for a direct communication path and a respective antenna beam direction used for an indirect communication path.

10. A communication system according to claim 9, wherein said first and second stations further comprise first and second controllers for replacing a blocked direct communication path by using first and second antenna beam directions having a high RSSI and a low relative distance to the respective antenna beam direction used for the blocked direct communication path.

11. A communication system according to claim 10, wherein said first and second controllers further are configured to replace a blocked indirect communication path by using first and second antenna beam directions having a high RSSI and a middle or high relative distance to the respective antenna beam directions used for the blocked direct communication path.

12. A communication system according to claim 1, wherein said first and second stations are stationary or quasi-stationary.

13. A communication system according to claim 1, wherein said plurality of first and second antennas are switched beam antennas or adaptive antenna arrays or mechanical/manual steering antennas.

14. A communication n system according to claim 1, wherein said communication system is an indoor communication system.

15. A communication system according to claim 1, wherein said first and second stations are adapted for bi-directional wireless communication using a transmission frequency of about 60 GHz via said communication paths.

16. A communication system according to claim 1, wherein the second station is configured to coherently combine information signals transmitted on the first communication path and on each of the at least one alternative communication path.

17. A communication system according to claim 16, wherein the information signals transmitted on the first communication path and on each one of the at least one alternative communication path are the same.

18. A communication system according to claim 1, wherein the second station is operable as a RAKE receiver, whereby each second antenna used for establishing said first communication path or said at least one alternative communication path corresponds to a finger of the RAKE receiver.

19. A communication system according to claim 1, wherein the second station comprises a RAKE receiver including a plurality of receiver chains and each second antenna is directly connected to one receiver chain.

20. A communication system according to claim 1, wherein the second station comprises switch network and a RAKE receiver comprising a plurality of receiver chains, wherein the number of receiver chains is smaller than the number of second antennas and each second antenna is connectable to a receiver chain via the switch network.

21. A communication method for providing wireless communication between a first station comprising a plurality of first antennas providing a plurality of first antenna beam directions and a second station comprising a plurality of second antennas providing a plurality of second antenna beam directions, the method comprising:
establishing a primary communication path via a first one of said plurality of first antennas and a first one of said plurality of said second antennas; and
establishing at least one alternative communication path via said first one of said plurality of first antennas and said first one of said plurality of said second antennas when the primary communication path is blocked, said at least one alternative communication path being different from said primary communication path.

22. A communication method according to claim 21, further comprising:
establishing at least one secondary communication path via a second one of said plurality of first antennas and a second one of said plurality of said second antennas, wherein said at least one secondary communication path is different from said primary communication path.

23. A communication method according to claim 21, wherein establishing a primary communication path comprises:

sending test signals from said first station to said second station by successively using all first antenna beam directions of said first station and by determining an individual receive signal strength indicator RSSI value of a test signal received by said second station for each first antenna beam direction of said first station;

selecting a respective first antenna beam direction of said first station having the best received signal strength indicator RSSI value for establishing the primary communication path;

sending test signals from said first station to said second station by using said selected first antenna beam direction of said first station and receiving said test signals by successively using all second antenna beam direction of said second station, wherein an individual receive signal strength indicator RSSI value of said test signal received using a respective second antenna beam direction of said second station is determined for each second antenna beam direction; and selecting a respective second antenna beam direction of said second station having the best receive signal strength indicator RSSI value for establishing the primary communication path.

24. A communication method according to claim 23, wherein sending test signals from said first station to said second station by successively using all first antenna beam directions is performed by:

sending a test signal from said first station to said second station by using a first antenna beam direction of said first station and a wide beam antenna of said second station;

determining a received signal strength indicator RSSI value of said test signal; and sending a further test signal from said first station to said second station by using another first antenna beam direction of said first station, said test signal being received by said wide beam antenna of said second station and determining another receive signal strength indicator RSSI value of said further test signal until an individual receive signal strength indicator RSSI value has been determined for every first antenna beam direction of said first station.

25. A communication method according to claim 23, wherein determining an individual receive signal strength indicator RSSI value of a test signal received by a receiving station for each antenna beam direction of a sending station comprises the transmission of the determined individual receive signal strength indicator RSSI value from the receiving station to the sending station.

26. A communication method according to claim 23, wherein the individual received signal strength indicator RSSI values determined for the individual first and second antenna beam directions are stored in first and second RSSI tables, respectively.

27. A communication method according to claim 26, wherein establishing at least one alternative communication path is performed by:

determining a relative distance between a respective first/second antenna beam direction used for said primary communication path and first/second antenna beam directions of unused first/second antennas;

identifying first/second antenna beam directions of unused first and second antennas having a sufficiently high received signal strength indicator RSSI value and a sufficient distance relative to the respective first/second antenna beam direction used for said primary communication path; and establishing the at least one secondary communication path by using said identified first and second antenna beam directions.

28. A communication method according to claim 27, wherein establishing the at least one alternative communication path by using said identified first and second antenna beam directions is performed until no further first and second antenna beam directions of unused first and second antennas having a sufficiently high received signal strength indicator RSSI value and a sufficient distance relative to the respective first/second antenna beam direction used for said primary communication path can be identified.

29. A communication method according to claim 21, wherein establishing a primary communication path is initiated by:

establishing a preliminary communication path between said first and second stations via a first wide beam antenna of said first station and a wide beam antenna of said second station to detect the presence of a respective first and second station.

30. A communication method according to claim 21, further comprising:

determining availability of the primary communication path and of the at least one secondary communication path;

using the primary communication path for wireless communication and returning to the determining if the primary communication path and the at least one secondary communication path are available;

using the primary communication path for wireless communication and establishing at least one new secondary communication path if the primary communication path is unavailable;

using the secondary communication path for wireless communication and establishing a new primary communication path if the primary communication path is unavailable and the at least one secondary communication path is available; and returning to the establishing a primary communication path if neither the primary communication path nor the at least one secondary communication path is available.

31. A communication method according to claim 30, wherein establishing a new primary communication path is performed by using the respective first and second antenna beam directions of unused first and second antennas having the highest available signal strength indicator RSSI value.

32. A communication method according to claim 21, wherein communication between said first and second station via said primary and/or at least one secondary communication path is a bi-directional wireless transmission using a transmission frequency of about 60 GHz.

33. A communication method according to claim 21, further comprising:

coherently combining information signals transmitted on the primary communication path and on each one of the at least one alternative communication path.

34. A communication method according to claim 33, wherein the information signals transmitted on the primary communication path and on each one of the at least one alternative communication path are the same.

35. A communication method according to claim 21, further comprising:

operating the second station as a RAKE receiver, wherein each second antenna used for establishing said primary communication path or said at least one alternative communication path corresponds to a finger of the RAKE receiver.

36. A communication method according to claim 21, wherein the second station comprises a RAKE receiver comprising a plurality of receiver chains and each second antenna is connected to one receiver chain.

37. A communication method according to claim 21, wherein the second station comprises a switch network and a RAKE receiver comprising a plurality of receiver chains, the number of chains being smaller than the number of the second narrow beam antennas, the method further comprising connecting each of second antenna used for establishing said primary communication path or said at least one alternative communication path to one receiver chain.

38. A non-transitory computer-readable medium including computer program, which when executed by a first communication station, causes first communication station to perform a method comprising:
  establishing a primary communication path via a first one of a plurality of first antennas of the first station and a first one of a plurality of second antennas of a second station; and
  establishing at least one alternative communication path via said first one of said plurality of first antennas and said first one of said plurality of second antennas when the primary communication path is blocked, wherein said at least one alternative communication path is different from said primary communication path.

* * * * *